United States Patent
Yoshizawa

(10) Patent No.: US 9,854,561 B2
(45) Date of Patent: Dec. 26, 2017

(54) COMMUNICATION CONTROL APPARATUS, COMMUNICATION CONTROL METHOD, TERMINAL APPARATUS, AND INFORMATION PROCESSING APPARATUS

(71) Applicant: SONY CORPORATION, Tokyo (JP)

(72) Inventor: Atsushi Yoshizawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/902,765

(22) PCT Filed: Jun. 24, 2014

(86) PCT No.: PCT/JP2014/066744
§ 371 (c)(1),
(2) Date: Jan. 4, 2016

(87) PCT Pub. No.: WO2015/019727
PCT Pub. Date: Feb. 12, 2015

(65) Prior Publication Data
US 2016/0174189 A1    Jun. 16, 2016

(30) Foreign Application Priority Data
Aug. 8, 2013   (JP) ................................ 2013-164776

(51) Int. Cl.
*H04W 68/00*    (2009.01)
*H04W 68/02*    (2009.01)
(Continued)

(52) U.S. Cl.
CPC ......... *H04W 68/025* (2013.01); *H04W 4/005* (2013.01); *H04W 52/0216* (2013.01);
(Continued)

(58) Field of Classification Search
CPC ... H04W 68/00; H04W 68/02; H04W 68/025; H04W 68/12; H04W 52/02
(Continued)

(56) References Cited

U.S. PATENT DOCUMENTS

2011/0306315 A1* 12/2011 Subrahmanya ...... H04B 1/7085
                                                                         455/226.1
2013/0107723 A1*  5/2013 Dhanda ............... H04W 68/025
                                                                         370/241
(Continued)

FOREIGN PATENT DOCUMENTS

CA         2851075 A1    6/2013
JP       2010/050969     4/2010
(Continued)

OTHER PUBLICATIONS

Office Action for KR Patent Application No. 10-2016-7002360, dated Oct. 14, 2016, 05 pages of Office Action and 04 pages of English Translation.
(Continued)

*Primary Examiner* — Temica M Beamer
(74) *Attorney, Agent, or Firm* — Chip Law Group

(57) ABSTRACT

[Object] To achieve more flexible DRX.
[Solution] Provided is a communication control apparatus including: a selection unit configured to select a paging segment from a plurality of paging segments that are repeatedly present during a period having a length of a first discontinuous reception (DRX) cycle for a terminal apparatus; and a control unit configured to perform paging for the terminal apparatus during the selected paging segment if performing the paging. The length of the first DRX cycle is not divisible by a length of each of the plurality of paging segments.

19 Claims, 17 Drawing Sheets

(51) Int. Cl.
  *H04W 52/02*   (2009.01)
  *H04W 76/04*   (2009.01)
  *H04W 4/00*    (2009.01)

(52) U.S. Cl.
  CPC ....... *H04W 68/005* (2013.01); *H04W 76/048* (2013.01); *Y02B 60/50* (2013.01)

(58) Field of Classification Search
  USPC ......................................................... 455/458
  See application file for complete search history.

(56) References Cited

U.S. PATENT DOCUMENTS

| | | | |
|---|---|---|---|
| 2016/0057738 A1* | 2/2016 | Lee ................... | H04W 52/0216 370/329 |
| 2016/0249406 A1* | 8/2016 | Bangolae .......... | H04W 52/0251 |
| 2017/0006549 A1* | 1/2017 | Deivasigamani . | H04W 52/0245 |

FOREIGN PATENT DOCUMENTS

| | | |
|---|---|---|
| JP | 2010-288278 | 12/2010 |
| KR | 10-2001-0071937 A | 7/2001 |
| KR | 20010071937 A | 7/2001 |
| NO | 2013/080764 A1 | 6/2015 |
| WO | 2000-04738 | 1/2000 |
| WO | 2013-080764 | 6/2013 |
| WO | 2013/080764 A1 | 6/2013 |

OTHER PUBLICATIONS

Office Action for KR Patent Application No. 10-2016-7002360, dated Apr. 26, 2017, 03 pages of Office Action and 02 pages of English Translation.
Extended European Search Report of EP Patent Application No. 14835037.4, dated Feb. 16, 2017, 10 pages.
Bell, et al., "Supporting Extended Long DRX Cycle", R2-132030, 3GPP TSG RAN WG2 Meeting #82, Fukuoka, Japan, May 20-24, 2013, 04 pages.

* cited by examiner

FIG. 9

| INDEX VALUE | LENGTH (SEC) OF DRX CYCLE | SHIFT AMOUNT OF PAGING SEGMENT |
|---|---|---|
| 0 | 60 | 0 |
| 1 | 300 | 0 |
| 2 | 600 | 0 |
| 3 | 60 | 1 |
| ⋮ | ⋮ | ⋮ |

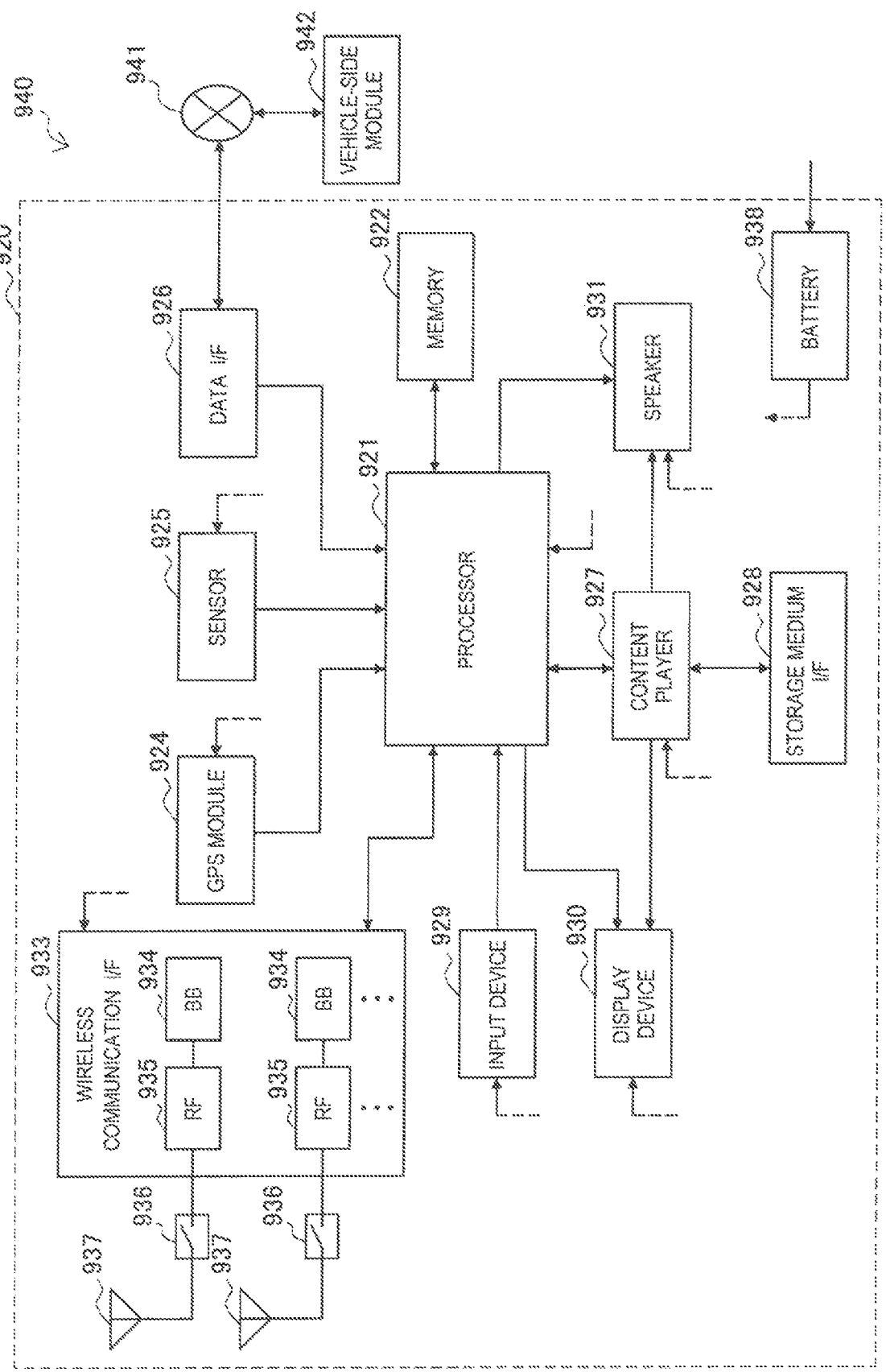

COMMUNICATION CONTROL APPARATUS, COMMUNICATION CONTROL METHOD, TERMINAL APPARATUS, AND INFORMATION PROCESSING APPARATUS

TECHNICAL FIELD

The present disclosure relates to communication control apparatuses, communication control methods, terminal apparatuses, and information processing apparatuses.

BACKGROUND ART

At present, the Third Generation Partnership Project (3GPP) is developing standards of Long Term Evolution (LTE) wireless communication systems. According to LTE, the use of techniques such as relay and carrier aggregation allows for an improvement in the maximum communication rate and an improvement in the quality at a cell edge. Also, attempts are being made to improve coverage by introducing base stations such as a Home eNodeB (HeNodeB), a femtocell base station, a small base station for mobile telephones), and a remote radio head (RHH), in addition to eNodeBs (macrocell base stations).

The 3GPP is also developing machine-type communications (MTC). MTC generally has the same meaning as that of machine-to-machine (M2M) communication, and means communication between machines that is not directly used by a human. MTC is mainly performed between a server and an MTC terminal that is not directly used by a human. MTC is believed to be an important elemental technology for efficiently connecting scattered apparatuses, such as a sensor network.

When LTE is applied to the above MTC, it is desirable that battery exchange for an MTC terminal be less frequent as possible. This is because battery exchange is a high-cost manual operation, and an MTC terminal may be installed at a place where battery exchange is difficult.

Incidentally, it is considered that, in the idle mode of LTE, the average power consumption of a terminal can be reduced by increasing a discontinuous reception (DRX) cycle, compared to the connection mode. Moreover, Patent Literature 1 and Patent Literature 2 describe improvements in paging technique.

CITATION LIST

Patent Literature

Patent Literature 1: JP 2010-288278A
Patent Literature 2: JP 2010-050969A

SUMMARY OF INVENTION

Technical Problem

However, in the background art including the technologies described in Patent Literature 1 and Patent Literature 2, it is difficult to achieve flexible DRX. For example, the lengths of the DRX cycle specified in LTE are 0.32 sec, 0.64 sec, 1.28 sec, and 2.56 sec (i.e., 32, 64, 128, and 256 radio frames). Therefore, for example, the maximum length of the DRX cycle is as short as 2.56 sec, and therefore, it is difficult to sufficiently reduce power consumption. Also, for example, the length of the DRX cycle is a multiple of any of 0.32 sec, 0.64 sec, 1.28 sec, and 2.56 sec, and therefore, it is difficult to provide a desired length (e.g., five minutes) of the DRX cycle.

Therefore, it is desirable that the present disclosure should provide an arrangement for achieving more flexible DRX.

Solution to Problem

According to the present disclosure, there is provided a communication control apparatus including: a selection unit configured to select a paging segment from a plurality of paging segments that are repeatedly present during a period having a length of a first discontinuous reception (DRX) cycle for a terminal apparatus; and a control unit configured to perform paging for the terminal apparatus during the selected paging segment if performing the paging. The length of the first DRX cycle is not divisible by a length of each of the plurality of paging segments.

According to the present disclosure, there is provided a communication control method including: selecting a paging segment from a plurality of paging segments that are repeatedly present during a period having a length of a first discontinuous reception (DRX) cycle for a terminal apparatus, using a processor; and performing paging for the terminal apparatus during the selected paging segment if performing the paging. The length of the first DRX cycle is not divisible by a length of each of the plurality of paging segments.

According to the present disclosure, there is provided a terminal apparatus including: an acquisition unit configured to acquire information indicating a paging segment selected from a plurality of paging segments that are repeatedly present during a period having a length of a first discontinuous reception (DRX) cycle for the terminal apparatus; and a control unit configured to control a DRX operation on the basis of the information indicating the paging segment. The length of the first DRX cycle is not divisible by a length of each of the plurality of paging segments.

According to the present disclosure, there is provided an information processing apparatus configured to control a terminal apparatus, including: a memory configured to store a predetermined program; and one or more processors capable of executing the predetermined program. The predetermined program is configured to execute acquisition of information indicating a paging segment selected from a plurality of paging segments that are repeatedly present during a period having a length of a first discontinuous reception (DRX) cycle for the terminal apparatus, and control of a DRX operation on the basis of the information indicating the paging segment. The length of the first DRX cycle is not divisible by a length of each of the plurality of paging segments.

Advantageous Effects of Invention

As described above, according to the present disclosure, more flexible DRX can be achieved. Moreover, the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 9 is an illustrative diagram for describing an example of parameter information.

FIG. 17 is a block diagram showing an example of a schematic configuration of a car navigation device to which technology according to the present disclosure may be applied.

DESCRIPTION OF EMBODIMENTS

Hereinafter, preferred embodiments of the present disclosure will be described in detail with reference to the appended drawings. Moreover, in this specification and the appended drawings, structural elements that have substantially the same function and structure are denoted with the same reference symbols, and repeated explanation of these structural elements is omitted.

Moreover, description will be provided in the following order.

1. Schematic configuration of communication system according to the present embodiment
2. Configuration of base station
3. Configuration of terminal apparatus
4. Flow of process
5. Application examples
6. Conclusion <1. Schematic Configuration of Communication System>

Figure 1:
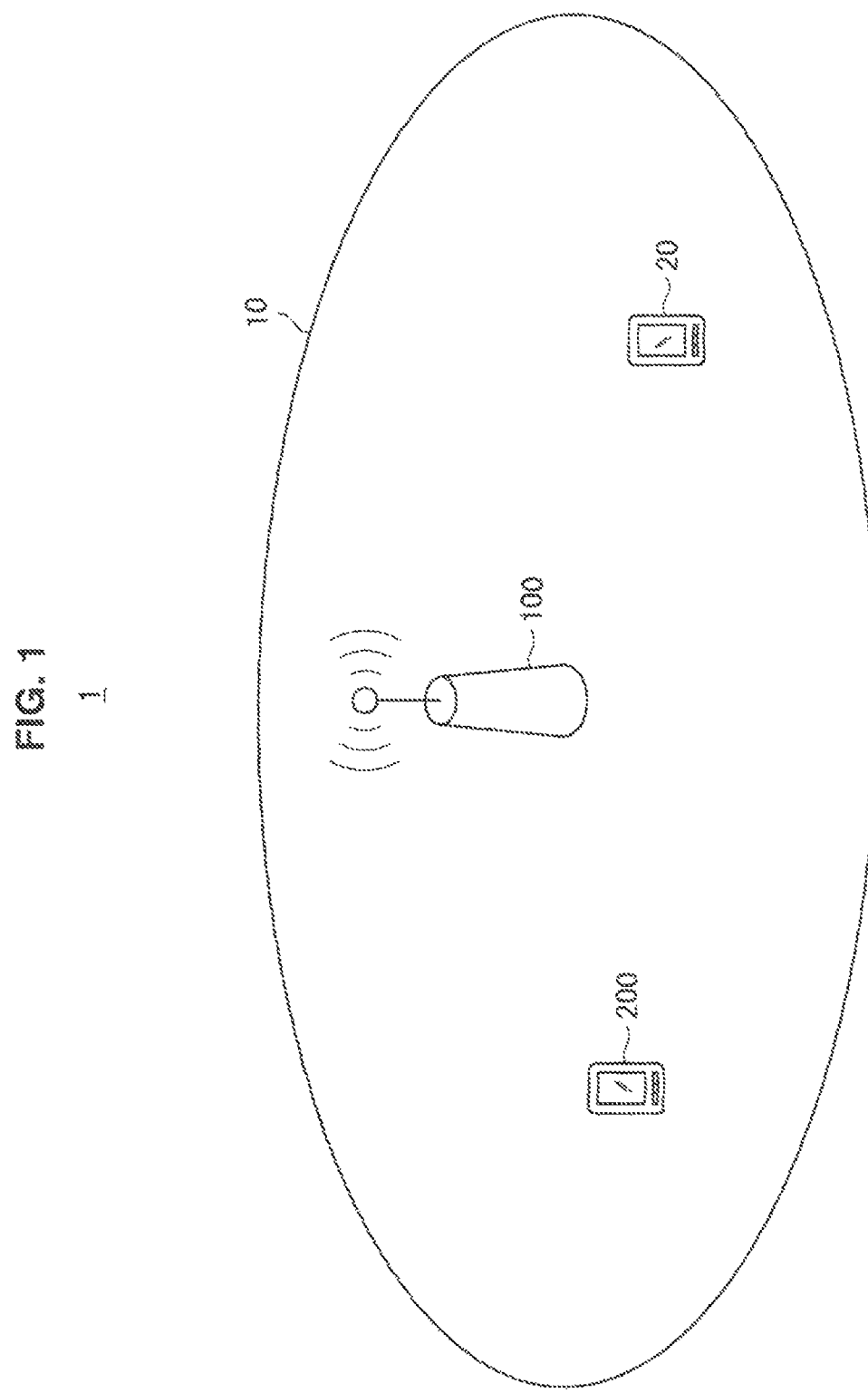
FIG. 1 is an illustrative diagram showing an example of a schematic configuration of a communication system 1 according to an embodiment of the present disclosure.

Firstly, a schematic configuration of a communication system according to an embodiment of the present disclosure will be described with reference to FIGS. 1-3. FIG. 1 is an illustrative diagram showing an example of a schematic configuration of a communication system 1 according to the present embodiment. Referring to FIG. 1, the communication system 1 includes a base station 100, a terminal apparatus 200, and a terminal apparatus 20. The communication system 1 complies with communication schemes such as, for example, LTE, LTE-Advanced, and the like.

(Base Station 100)

The base station 100 wirelessly communicates with the terminal apparatus 200 and the terminal apparatus 20, which are located in a cell 10. The base station 100) also communicates with a core network node (e.g., a mobility management entity (MME) a serving gateway (S-GW), a packet data network gateway (P-GW), etc.).

The base station 100 also performs paging. Specifically, for example, the base station 100 transmits a paging message for a terminal apparatus at a paging opportunity of the terminal apparatus, when necessary, during each of paging segments that are repeatedly present on the time axis. The paging segment may also be called a paging cycle. A specific example of the paging segment will now be described with reference to FIGS. 2 and 3.

Figure 2:
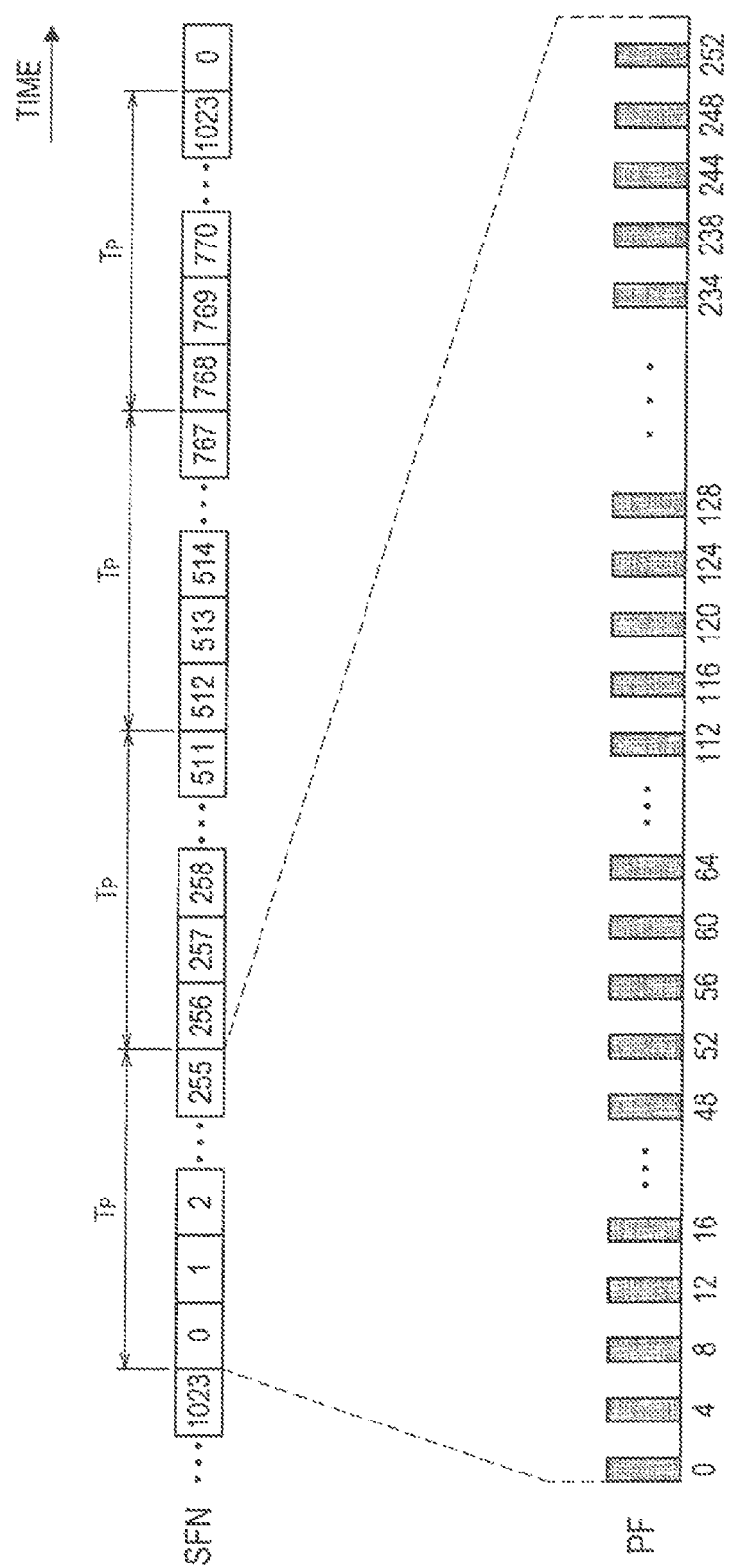
FIG. 2 is an illustrative diagram for describing a first example of a paging segment according to an embodiment.

FIG. 2 is an illustrative diagram for describing a first example of the paging segment according to the present embodiment. Referring to FIG. 2, shown are the system frame numbers (SFNs) of radio frames 0-1023 and the preceding and following radio frames. In this example, the length $T_P$ of a paging segment is 256 radio frames (i.e., 2.56 sec). The base station 100 transmits a paging message for a terminal apparatus in paging frames (PF) during each paging segment having the length $T_P$, where the paging message has identification information (e.g., an international mobile subscriber identity (IMSI)) corresponding to the PFs. For example, thus, the paging segment similar to that in the background art may be used. Moreover, the length $T_P$ of a paging segment may be 32 radio frames (0.32 sec), 64 radio frames (0.64 sec), or 128 radio frames (1.28 sec), instead of 256 radio frames (2.56 sec).

Figure 3:
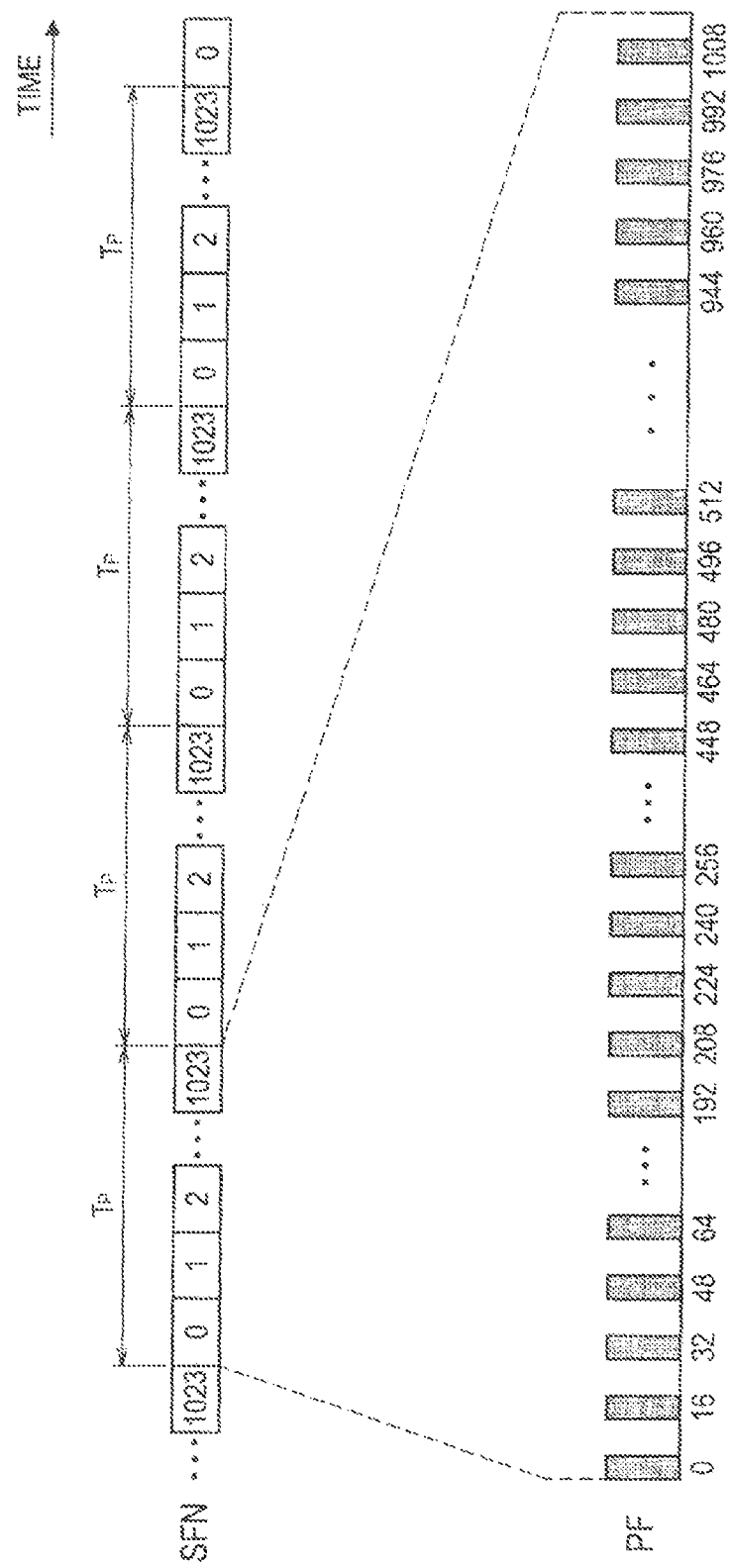
FIG. 3 is an illustrative diagram for describing a second example of a paging segment according to an embodiment.

FIG. 3 is an illustrative diagram for describing a second example of the paging segment according to the present embodiment. Referring to FIG. 3, shown are the system frame numbers (SFNs) of four sets of radio frames 0-1023 and the preceding and following radio frames. In this example, the length $T_P$ of a paging segment is 1024 radio frames (i.e., 10.24 sec). The base station 100 transmits a paging message for a terminal apparatus in paging frames (PF) during each paging segment having the length $T_P$, where the paging message has identification information (e.g., an IMSI) corresponding to the PFs. For example, thus, the paging segment longer than that in the background art may be used. Moreover, the length $T_P$ of a paging segment may be an integer multiple of 1024 radio frames (an integer multiple of 10.24 sec), instead of 1024 radio frames (10.24 sec). Specifically, the length of a paging segment may be an integer multiple of the length from the start time point of a radio frame having the minimum system frame number (SFN) for identifying a radio frame to the end time point of a radio frame having the maximum SFN number.

Moreover, a cycle of radio frames having a system frame number (SFN) of 0-1023 is hereinafter referred to as an SFN cycle. Also, when the repeated SFN cycles are used, each SNF cycle is identified by, for example, a hyper frame number (HFN) that corresponds to that SNF cycle.

(Terminal Apparatus 200)

The terminal apparatus 200, when located in the cell 10, wirelessly communicates with the base station 100. The terminal apparatus 200 also communicates with other apparatuses (e.g., a core network node and an external apparatus) through the base station 100.

The terminal apparatus 200 also performs a discontinuous reception (DRX) operation. The DRX operation is also called an intermittent reception operation. The terminal apparatus 200 performs the DRX operation in, for example, an idle mode. Specifically, for example, the terminal apparatus 200 performs an ordinary reception operation at paging opportunities of the terminal apparatus 200, and stops at least a portion of the reception operation during other periods. For example, the terminal apparatus 200, when stopping at least a portion of the reception operation, does not supply power to at least a portion of circuits involved in the reception operation. Moreover, the terminal apparatus 200 may perform the DRX operation in a connection mode.

In particular, in the present embodiment, the length of a first DRX cycle for the terminal apparatus 200 is longer than the above paging segment. Moreover, the terminal apparatus 200 may use a DRX cycle different from the above first DRX cycle.

The terminal apparatus 200 performs, for example, machine-type communication (MTC).

(Terminal Apparatus 20)

The terminal apparatus 20, when located in the cell 10, wirelessly communicates with the base station 100. The terminal apparatus 20 also communicates with other apparatuses (e.g., a core network node and an external apparatus) through the base station 100.

The terminal apparatus 20 also performs the DRX operation as with the terminal apparatus 200.

In particular, in the present embodiment, the length of a second DRX cycle for the terminal apparatus 20 is the same as the above length of a paging segment. Moreover, the terminal apparatus 20 may also use a DRX cycle different from the above second DRX cycle.

For example, the above paging segment is a segment which has a predetermined length and during which paging is performed for each terminal apparatus which uses a second DRX cycle of the predetermined length. In other words, a paging opportunity for each terminal apparatus 20 is given for each paging segment.

Although FIG. 1 shows one terminal apparatus 200 and one terminal apparatus 20, the communication system 1 may, of course, include two or more terminal apparatuses 200 and two or more terminal apparatuses 20.

<2. Configuration of Base Station>

Figure 4:
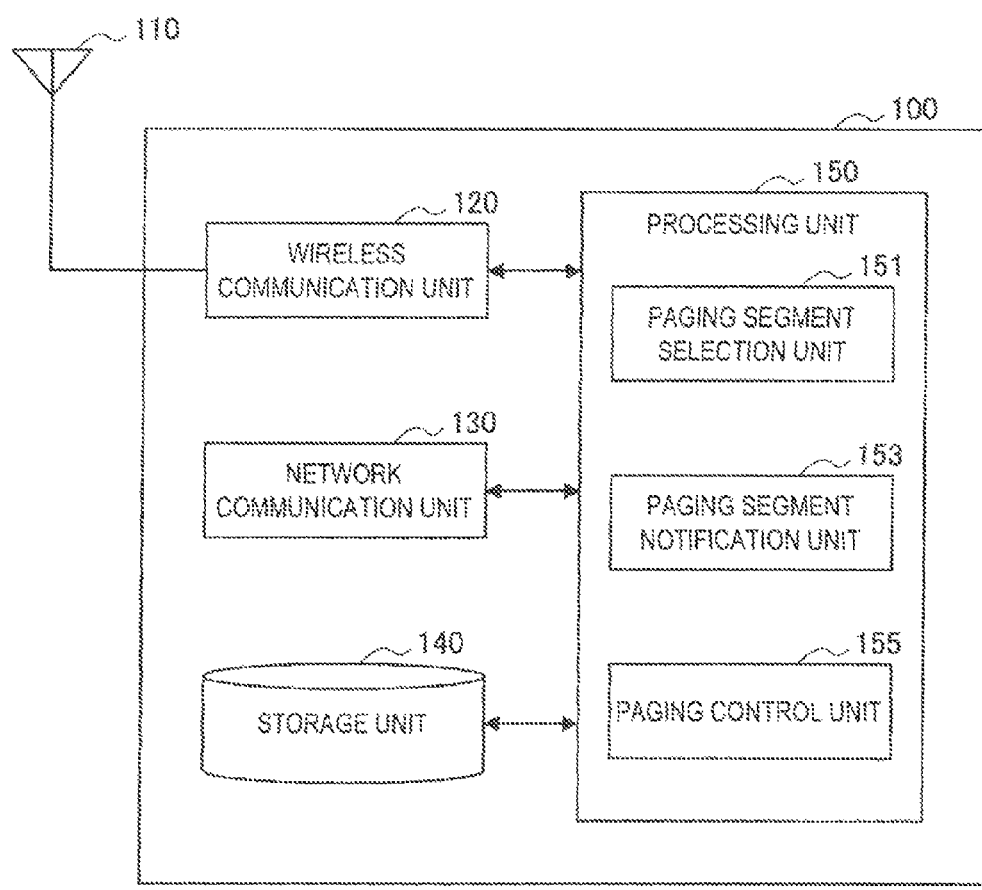
FIG. 4 is a block diagram showing an example of a configuration of a base station according to an embodiment.

Next, an example of a configuration of the base station 100 according to the present embodiment will be described with reference to FIGS. 4-9. FIG. 4 is a block diagram showing an example of a configuration of the base station 100 according to the present embodiment. Referring to FIG. 4, the base station 100) includes an antenna unit 110, a wireless communication unit 120, a network communication unit 130, a storage unit 140, and a processing unit 150.

(Antenna Unit 110)

The antenna unit 110 receives a radio signal, and outputs the received radio signal to the wireless communication unit 120. The antenna unit 110 also transmits a transmission signal output from the wireless communication unit 120.

(Wireless Communication Unit 120)

The wireless communication unit 120 wirelessly communicates with a terminal apparatus located in the cell 10. For example, the wireless communication unit 120 wirelessly communicates with the terminal apparatus 200. Also, for example, the wireless communication unit 120 wirelessly communicates with the terminal apparatus 20.

(Network Communication Unit 130)

The network communication unit 130 communicates with other communication nodes. For example, the network communication unit 130 communicates with other base stations 100. Also, for example, the network communication unit 130 communicates with a core network node.

(Storage Unit 140)

The storage unit 140 stores a program and data for operating the base station 100.

(Processing Unit 150)

The processing unit 150 provides various functions of the base station 100. The processing unit 150 includes a paging segment selection unit 151, a paging segment notification unit 153, and a paging control unit 155.

(Paging Segment Selection Unit 151)

The paging segment selection unit 151 selects a paging segment from a plurality of paging segments that are repeatedly present during a period having the length of the first DRX cycle for the terminal apparatus 200.

For example, the paging segment selection unit 151 selects a paging segment from the above plurality of paging segments for each of a plurality of successive periods each having the above length of the first DRX cycle. More specifically, for example, the paging segment selection unit 151 selects a paging segment from the above plurality of paging segments for each of the above plurality of periods so that an interval of a plurality of paging segments selected from the above plurality of periods becomes closer to the above length of the first DRX cycle.

Case where the Length of the First DRX Cycle is an Integer Multiple of the Length of a Paging Segment As a first example, the above length of the first DRX cycle is divisible by the length of a paging segment. In other words, the above length of the first DRX cycle is an integer multiple of the length of a paging segment. A specific example of selection of a paging segment in such a case will now be described with reference to FIG. 5.

Figure 5:
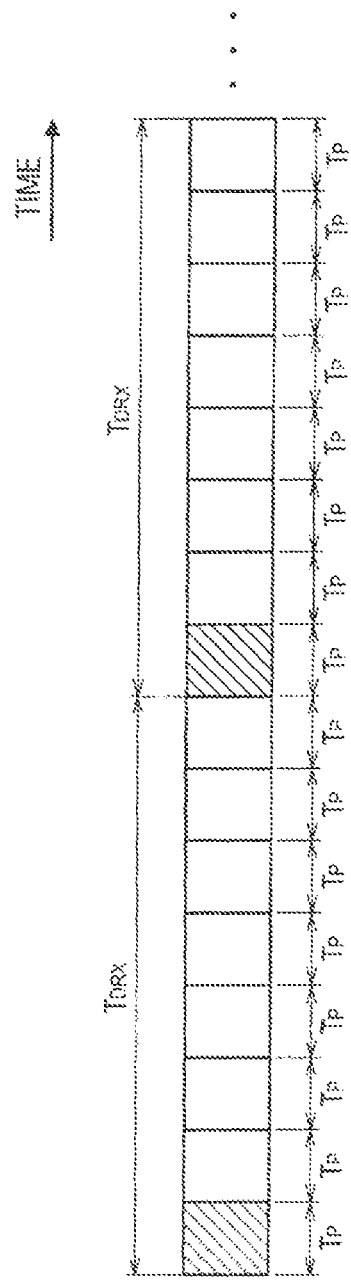
FIG. 5 is an illustrative diagram for describing an example of selection of a paging segment in a case where the length of a first DRX cycle is an integer multiple of a paging segment.

FIG. 5 is an illustrative diagram for describing an example of selection of a paging segment in a case where the length of the first DRX cycle is an integer multiple of a paging segment. Referring to FIG. 5, shown are two successive periods each having the length of the first DRX cycle, which is $T_{DRX}$, and paging segments having a length $T_P$. In this example, the length $T_{DRX}$ of the first DRX cycle (i.e., the length $T_{DRX}$ of each of the above two periods) is eight times the length $T_P$ of a paging segment. In other words, there are eight repeated paging segments each having the length $T_P$ during each period having the length $T_{DRX}$. And, for example, the paging segment selection unit 151 selects the first paging segment from the eight paging segments. Also, the first paging segment is selected from the eight paging segments for each period having the length $T_{DRX}$ so that an interval of the two paging segments $T_P$ selected for the two successive periods each having the length $T_{DRX}$ becomes closer to the length $T_{DRX}$ of the first DRX. Although FIG. 5 shows two successive periods having the length $T_{DRX}$, there may, of course, be a larger number of successive periods each having the length $T_{DRX}$, and the first paging segment may be selected for each period. Also, instead of the first paging segment of the eight paging segments, another paging segment may be selected from the eight paging segments.

For example, as described above, a paging segment is selected from a plurality of paging segments that are repeatedly present during a period having the length $T_{DRX}$ of the first DRX cycle.

Case where the Length of the First DRX Cycle is not an Integer Multiple of the Length of a Paging Segment As a second example, the above length of the first DRX cycle is not divisible by the length of each paging segment. In other words, the above length of the first DRX cycle is not an integer multiple of the length of a paging segment. A specific example of selection of a paging segment in such a case will now be described with reference to FIG. 6.

Figure 6:
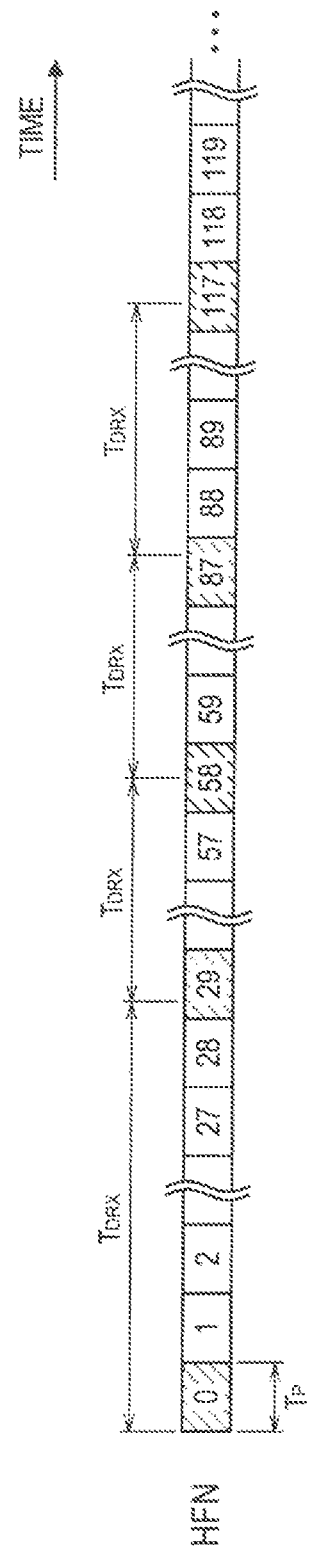
FIG. 6 is an illustrative diagram for describing an example of selection of a paging segment in a case where the length of a first DRX cycle is not an integer multiple of a paging segment.

FIG. 6 is an illustrative diagram for describing an example of selection of a paging segment in a case where the length of the first DRX cycle is not an integer multiple of a paging segment. In this example, as in the example shown in FIG. 3, it is assumed that the length $T_P$ of a paging segment is 1024 radio frames (i.e., 10.24 sec), i.e., the length of an SFN cycle. Also, it is assumed that each SFN cycle is a paging segment. Referring to FIG. 6, shown are periods having the length $T_{DRX}$ of the first DRX cycle, and paging segments having the length $T_P$. Each paging segment having the length $T_P$ is an SFN cycle, and is indicated by an HFN value. In this example, for example, the length $T_{DRX}$ of the first DRX cycle (i.e., the length $T_{DRX}$ of a period) is 5 min (300 sec), which is not divisible by the length $T_P$ of a paging segment, i.e., 10.24 sec. For example, during one period having the length $T_{DRX}$, there are 30 repeated paging segments $T_P$ indicated by HFN values of 0-29. And, for example, the paging segment selection unit 151 selects a paging segment indicated by an HFN value of 0 from the 30 paging segments indicated by HFN values of 0-29. Similarly, during one period having the length $T_{DRX}$, there are 30 repeated paging segments indicated by HFN values of 29-58, and a paging segment indicated by an HFN value of 29 is selected. Also, during one period having the length $T_{DRX}$, there are 30 repeated paging segments indicated by HFN values 58-87, and a paging segment indicated by an HFN value of 58 is selected. Also, during one period having the length $T_{DRX}$, there are 31 repeated paging segment $T_P$ indicated by HFN values of 87-117, and a paging segment indicated by an HFN value of 87 is selected. Thus, paging segments approximately corresponding to timings such as 0 min (HFN=0), 5 min (HFN=29), 10 min (HFN=58), and 15 min (HFN=87) may be selected. Moreover, as with SFNs, HFN values may, for example, be notified of in system information such as a master information block (MIB) or a system information block (SIB). Alternatively, HFN values may be notified of during paging for the terminal apparatus 200. More specifically, HFN values may be contained in a paging message for the terminal apparatus 200.

For example, a paging segment is selected in the above-described manner. Various techniques may exist as a specific technique of selecting a paging segment in such a manner. As an example, the paging segment selection unit 151 selects a paging segment from the above plurality of paging segments for each of the above plurality of periods, using calculation including division involving the length of the first DRX cycle and the length of a paging segment.

Specifically, for example, it is assumed that, as shown in FIG. 6 and described above, each paging segment is an SFN cycle and is indicated by an HFN value. In this case, a selected paging segment is indicated by an HFN value of $k_{paging}$ that is represented using the length $T_{DRX}$ (sec) of the first DRX cycle, and the length of a paging segment (i.e., the length of an SFN cycle), i.e., 10.24 sec, as follows.

$$k_{paging} = \mathrm{floor}\left(\frac{T_{DRX} \times i}{10.24}\right) \quad \text{[Formula 1]}$$

In the above formula, "i" is an index of a selected paging segment, and floor( ) is a function for truncating decimal fractions. As an example, as in the example described with reference to FIG. 6, the length $T_{DRX}$ of the first DRX cycle is 300 sec. In this case, if i=0, $k_{paging}$=0. If i=1, $k_{paging}$=29. If i=2, $k_{paging}$=58. If i=3, $k_{paging}$=87.

Moreover, for example, HFN values have a value of 0-7499. In other words, HFN values are repeated every 7500 SFN cycles (i.e., 76800 sec). The time 76800 sec is not only an integer multiple of 10.24 sec, but also a multiple of a practically useful time such as 5 min or 10 min. Therefore, similarly, a paging segment can be selected in units of the HFN value cycle (i.e., 76800 sec). A specific example of this point will now be described with reference to FIG. 7.

Figure 7:
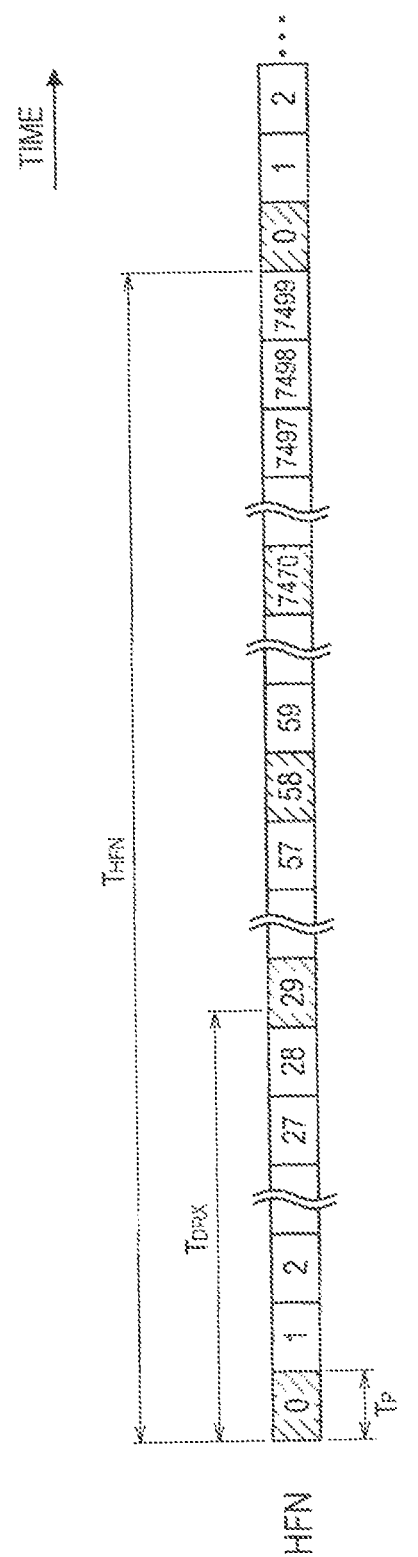
FIG. 7 is an illustrative diagram for describing an example of selection of a paging segment in units of an HFN value cycle.

FIG. 7 is an illustrative diagram for describing an example of selection of a paging segment in units of the HFN value cycle. Referring to FIG. 7, shown are HFN value cycles having a length $T_{HFN}$ (i.e., 7500 SFN cycles), periods having the length $T_{DRX}$ of the first DRX cycle, and paging segments having the length $T_P$. A paging segment can be similarly selected in units of such a period having the length $T_{HFN}$. As an example, a paging segment indicated by an HFN value of 0 is selected in all HFN value cycles.

Shift of Selected Paging Segment

For example, the paging segment selection unit 151 selects a paging segment from the above plurality of paging segments for each of the above plurality of periods, on the basis of shift information for shifting paging segments separately, for the terminal apparatus 200.

More specifically, for example, the above shift information indicates the amount of shift of a paging segment. The amount of shift is an integer multiple of a paging segment. As an example, when the above shift information indicates a shift amount of 0, a paging segment indicated by an HFN value of k is selected. When the above shift information indicates a shift amount of 1, a paging segment indicated by an HFN value of k+1 is selected. A specific example will now be described with reference to FIG. 8.

Figure 8:
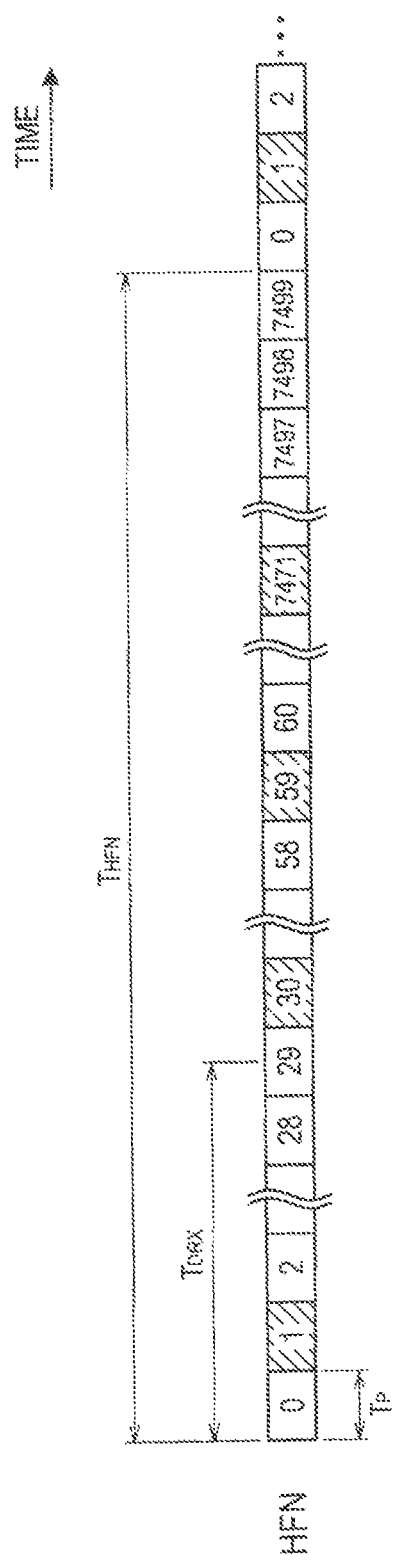
FIG. 8 is an illustrative diagram for describing an example of selection of a paging segment on the basis of shift information.

FIG. 8 is an illustrative diagram for describing an example of selection of a paging segment on the basis of shift information. For example, if the example shown in FIG. 7 is an illustrative case where the above shift information indicates a shift amount of 0, the example shown in FIG. 8 is an illustrative case where the above shift information indicates a shift amount of 1. While paging segments indicated by HFN values of 0, 29, 58, and the like are selected in the example shown in FIG. 7, paging segments indicated by HFN values of 1, 30, 59, and the like are selected in the example shown in FIG. 8. Thus, selected paging segments are shifted.

Moreover, a paging segment selected on the basis of shift information is indicated by the following HFN value of $k_{paging}$ using a shift amount of j.

$$k_{paging} = \mathrm{floor}\left(\frac{T_{DRX} \times i}{10.24}\right) + j \quad \text{[Formula 2]}$$

As an example, the length $T_{DRX}$ of the first DRX cycle is 300 sec and a shift amount of j is 1. In this case, if i=0, $k_{paging}$=1. If i=1, $k_{paging}$=30. If i=2, $k_{paging}$=59. If i=3, $k_{paging}$=88.

Such selection of paging segments on the basis of shift information allows for any shift of selected paging segments. Therefore, for example, a paging message can be transmitted and received at a more desirable timing. As an example, a paging message can be transmitted and received at a more appropriate timing, taking into consideration the time it takes to perform data processing for each application, or the like.

(Paging Segment Notification Unit 153)

The paging segment notification unit 153 notifies the terminal apparatus 200 of the above selected paging segment. For example, the paging segment notification unit 153 notifies the terminal apparatus 200 of the above selected paging segment by RRC signaling or in system information. Such notification allows the terminal apparatus 200 to perform an appropriate DRX operation.

Providing Information Indicating Paging Segment

As a first example, the paging segment notification unit 153 notifies the terminal apparatus 200 of the above selected paging segment, by providing information indicating the above selected paging segment (hereinafter referred to as "paging segment information") to the terminal apparatus 200.

Specifically, for example, as described with reference to FIG. 7, a paging segment is an SFN cycle and is indicated by an HFN value. In this case, for example, the paging segment information is an HFN value. Moreover, as an example, the HFN value may have a value of 0-7499, i.e., may be 13-bit information.

Moreover, in the paging segment information, a paging segment may be indicated by the start time point and end time point of the paging segment, instead of an HFN value. As a result, even if a paging segment is not an SFN cycle (e.g., a paging segment is an integer multiple of an SFN cycle, or a paging segment is shorter than an SFN cycle, etc.), a selected paging segment can be notified of.

Also, the paging segment information may indicate a plurality of paging segments (e.g., a list of selected paging segments), instead of one selected paging segment.

Also, an index value(s) indicating one paging segment or a plurality of paging segments may be shared by the base station 100 and the terminal apparatus 200, and may be provided as the above paging segment information.

Thus, as a first example, by providing the paging segment information, a selected paging segment is directly notified of. As a result, the base station 100 can more freely select a paging segment, without depending on the terminal apparatus 200.

Providing Information Indicating Parameter for Specifying Paging Segment

As a second example, the paging segment notification unit 153 may notify the terminal apparatus 200 of the above selected paging segment by providing, to the terminal apparatus 200, information indicating one or more parameters for specifying the above selected paging segment (hereinafter referred to as "parameter information").

Specifically, for example, the above one or more parameters may include the length of the DRX cycle and the shift amount of a paging segment. A specific example of this point will now be described with reference to FIG. 9.

FIG. 9 is an illustrative diagram for describing an example of the parameter information. Referring to FIG. 9, shown are combinations of the length of the DRX cycle and the shift amount of a paging segment, and index values. For example, as combinations of the length of the DRX cycle (sec) and the shift amount, shown are "60" and "0" (index value: 1). "300" and "0" (index value: 2), "600" and "0" (index value: 3), and "60" and "1" (index value: 4). For example, the parameter information may be such an index value indicating the two parameters. In this case, information indicating a relationship between a combination of the length of the DRX cycle and the shift amount of a paging segment, and an index value (i.e., information shown in FIG. 9) may be previously shared by the base station 100 and the terminal apparatus 200.

Moreover, the parameter information provided is not limited to the above index value. For example, the parameter information may be a combination of different index values indicating different parameters (e.g., a combination of an index value indicating the length of the DRX cycle and an index value indicating the shift amount). Alternatively, the parameter information may be directly the values of one or more parameters (e.g., the length of the DRX cycle and the shift amount, etc.).

Thus, as a second example, by providing the parameter information, a selected paging segment is indirectly notified of. As a result, the terminal apparatus 200 can specify a selected paging segment on its own. Therefore, the terminal apparatus 200 does not have to be at all times notified of a selected paging segment. As a result, for example, the overhead used for notification of paging segments can be reduced.

(Paging Control Unit 155)

The paging control unit 155 performs paging for a terminal apparatus.

For example, the paging control unit 155 generates a paging message that is transmitted at each paging opportunity. A paging message that is transmitted at each paging opportunity is for a terminal apparatus corresponding to the paging opportunity. The paging control unit 155 also transmits a generated paging message through the wireless communication unit 120 at each paging opportunity.

Also, for example, the paging control unit 155, when it is necessary for a terminal apparatus to acquire system information again, performs paging for the terminal apparatus. The paging control unit 155 also performs paging for a terminal apparatus in response to a request from other apparatuses. For example, such other apparatuses are a core network node (e.g., an MME), and the above request is a paging message (e.g., an S1AP paging message) from the above other apparatuses.

Paging for Terminal Apparatus 200

Paging Segment During which Paging is Performed

For example, the paging control unit 155, when performing paging for the terminal apparatus 200, performs paging during the above selected paging segment. In other words, the paging control unit 155 performs paging for the terminal apparatus 200, when necessary, during the above selected paging segment.

As a specific example, referring to the example of FIG. 6, paging segments are an SFN cycle, and the paging control unit 155 performs paging for the terminal apparatus 200, when necessary, during paging segments (SFN cycles) indicated by, for example, HFN values of 0, 29, 58, 87, and the like. Moreover, the paging control unit 155 does not perform paging for the terminal apparatus 200 during the other paging segments (SFN cycles) even when it is necessary to perform paging for the terminal apparatus 200.

As a result, more flexible DRX can be achieved.

For example, firstly, a DRX cycle that is longer than the length of a paging segment can be used. As a result, the power consumption of the terminal apparatus 200 can be reduced. Also, for example, secondly; even when a longer DRX cycle is used, a paging opportunity can be limited to a shorter period (i.e., a selected paging segment) irrespective of the identification information (e.g., an IMSI) of a terminal apparatus, and therefore, paging can be performed at a more desirable timing. Also, for example, thirdly, even if a desired DRX cycle is not divisible by a paging segment, a DRX cycle that is considerably close to the desired DRX cycle can be provided.

As a result, for example, a practically useful DRX cycle having a length of 5 min, 10 min, or the like can be provided with a small error (e.g., less than one paging segment). Also, for example, paging can be performed at desired time (e.g., time 0:00, 0:05, 0:10, etc.). Therefore, for example, a terminal apparatus can be operated according to requests of various applications such as an MTC application.

Paging During Selected Paging Segment

Moreover, for example, the paging control unit 155, when performing paging for the terminal apparatus 200, performs paging for the terminal apparatus 200 at a paging opportunity corresponding to identification information (hereinafter referred to as a "terminal ID") of the terminal apparatus 200 during the above selected paging segment. In other words, during the selected paging segment, ordinary paging for the terminal apparatus 200 is performed. The above paging opportunity is, for example, a paging frame corresponding to the terminal ID (e.g., an IMSI).

As a specific example, as shown in the example of FIG. 3, paging segments are an SFN cycle, and the paging control unit 155 transmits a paging message for the terminal apparatus 200 in paging frames corresponding to the terminal ID of the terminal apparatus 200, during the selected paging segments.

As a result, for example, paging for the terminal apparatus 200 having the first DRX cycle can be performed while an existing arrangement for paging is maintained.

Paging for Terminal Apparatus 20

Paging Segment During which Paging is Performed

For example, the paging control unit 155 performs paging for the terminal apparatus 20, when necessary, during each paging segment. In other words, ordinary paging for the terminal apparatus 20 is performed.

As a specific example, referring to the example of FIG. 6, paging segments are an SFN cycle, and the paging control unit 155 performs paging for the terminal apparatus 20, when necessary during paging segments (SFN cycles) indicated by, for example, HFN values.

Paging During Selected Paging Segment

Moreover, for example, the paging control unit 155, when performing paging for the terminal apparatus 20, performs paging for the terminal apparatus 20 at a paging opportunity corresponding to the terminal ID of the terminal apparatus 20 during a paging segment. In other words, ordinary paging for the terminal apparatus 20 is performed.

As a specific example, as shown in the example of FIG. 3, paging segments are an SFN cycle, and the paging control unit 155 transmits a paging message for the terminal apparatus 20 in paging frames corresponding to the terminal ID (e.g., an IMSI) of the terminal apparatus 20, during paging segments.

(Others)

Moreover, a paging segment may be selected from the above plurality of paging segments, or the above paging is performed during the above selected paging segment, taking into consideration a request of the terminal apparatus 200 that is related to a DRX operation. Specifically, operations of the paging segment selection unit 151 and the paging control unit 155 (and the paging segment notification unit 153), that are related to the terminal apparatus 200, may be performed, taking the above request into consideration.

As an example, the base station 100 may be notified of the above request of the terminal apparatus 200 by providing preference information of the terminal apparatus 200. Also, the base station 100 may determine whether to allow the paging segment selection unit 151, the paging segment notification unit 153, and the paging control unit 155 to perform an operation related to the terminal apparatus 200, taking the preference information into consideration. Alternatively, the base station 100 may determine whether to allow the terminal apparatus 200 to use the first DRX cycle, taking the preference information into consideration. Alternatively, the base station 100 may determine a DRX cycle that the base station 100 allows the terminal apparatus 200 to use, of DRX cycle candidates including the first DRX cycle, taking the preference information into consideration.

As a result, for example, the likelihood that the terminal apparatus 200 performs a desired DRX operation possibly increases.

<3. Configuration of Terminal Apparatus>

Figure 10:
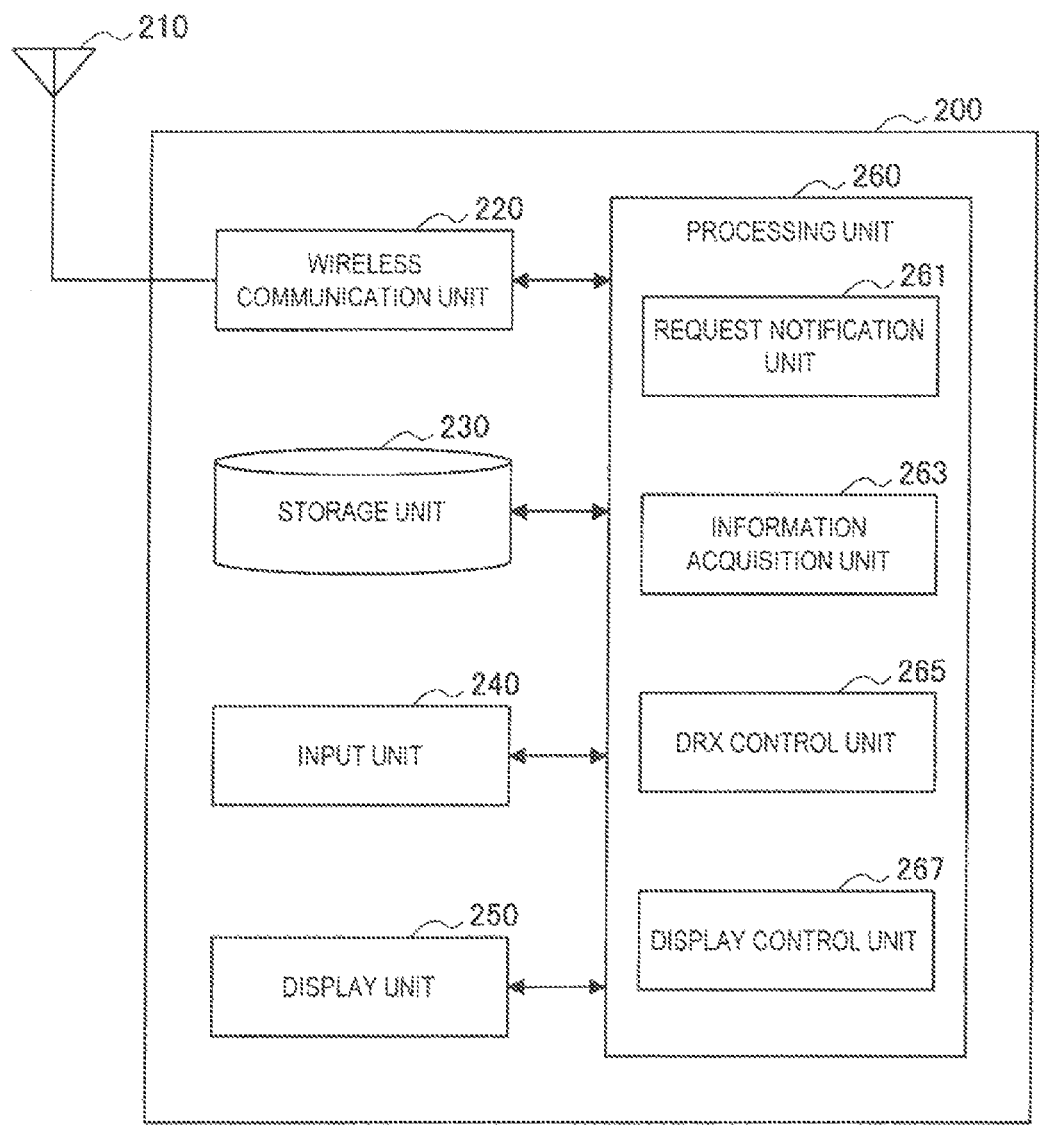
FIG. 10 is a block diagram showing an example of a configuration of a terminal apparatus according to an embodiment.

Next, an example of a configuration of the terminal apparatus 200 according to the present embodiment will be described with reference to FIG. 10. FIG. 10 is a block diagram showing an example of a configuration of the terminal apparatus 200 according to the present embodiment. Referring to FIG. 10, the terminal apparatus 200 includes an antenna unit 210, a wireless communication unit 220, a storage unit 230, an input unit 240, a display unit 250, and a processing unit 260.

(Antenna Unit 210)

The antenna unit 210 receives a radio signal, and outputs the received radio signal to the wireless communication unit 220. The antenna unit 210 also transmits a transmission signal output from the wireless communication unit 220.

(Wireless Communication Unit 220)

The wireless communication unit 220, when the terminal apparatus 200 is located in the cell 10, wirelessly communicates with the base station 100.

(Storage Unit 230)

The storage unit 230 stores a program and data for operating the terminal apparatus 200.

(Input Unit 240)

The input unit 240 receives an input entered by the user of the terminal apparatus 200. Then, the input unit 240 provides the input result to the processing unit 260.

(Display Unit 250)

The display unit 250 displays an output screen (i.e., an output image) from the terminal apparatus 200. For example, the display unit 250 displays an output screen under the control of the processing unit 260 (a display control unit 267).

(Processing Unit 260)

The processing unit 260 provides various functions of the terminal apparatus 200. The processing unit 260 includes a request notification unit 261, an information acquisition unit 263, a DRX control unit 265, and a display control unit 267.

(Request Notification Unit 261)

The request notification unit 261 notifies other apparatuses of a request of the terminal apparatus 200.

For example, the request notification unit 261 may notify the base station 100 of a request of the terminal apparatus 200 related to a DRX operation. Specifically, for example, the request notification unit 261 may notify the base station 100 by providing preference information of the terminal apparatus 200. The preference information may relate to preference information relating to power consumption, preference information relating to a DRX cycle used or paging, or preference information relating to MTC.

As a result, for example, the likelihood that the terminal apparatus 200 performs a desired DRX operation possibly increases.

(Information Acquisition Unit 263)

The information acquisition unit 263 acquires information (i.e., paging segment information) indicating a paging segment selected from a plurality of paging segments that are repeatedly present during a period having the length of the first DRX cycle for the terminal apparatus 200. For example, the above length of the first DRX cycle is not divisible by the length of each of the above plurality of paging segments.

For example, the information acquisition unit 263, when notified of the above paging segment by the base station 100, acquires information indicating the above paging segment.

Case where Information Indicating a Paging Segment is Provided

As a first example, by providing information indicating the above paging segment (i.e., paging segment information), the above paging segment is notified of by the base station 100. In this case, the information acquisition unit 263 acquires the above paging segment information thus provided. Specific details of the above paging segment information are the same as those described in connection with the configuration of the base station 100.

As a result, the base station 100 can freely select a paging segment without depending on the terminal apparatus 200.

Case where Information Indicating a Parameter for Specifying a Paging Segment is Provided As a second example, the above paging segment may be notified of by the base station 100 by providing information (i.e., parameter information) indicating one or more parameters for identifying the above paging segment. In this case, the information acquisition unit 263 may acquire information indicating the above paging segment (i.e., paging segment information) by specifying the above paging segment using the above one or more parameters. Specific details of the above parameter information are the same as those described in connection with the configuration of the base station 100. Moreover, the information acquisition unit 263 may specify a selected paging segment using a technique similar to that which is used by the base station 100 to select a paging segment.

As a result, the terminal apparatus 200 can specify a selected paging segment on its own. Therefore, the terminal apparatus 200 does not have to be at all times notified of a selected paging segment. As a result, for example, the overhead used for notification of paging segments can be reduced.

(DRX Control Unit 265)

The DRX control unit 265 controls a DRX operation on the basis of the above information indicating the above paging segment (i.e., paging segment information).

For example, the DRX control unit 265 controls a DRX operation when the terminal apparatus 200 is in an idle mode (e.g., a radio resource control (RRC) idle mode).

More specifically, for example, the DRX control unit 265 controls the terminal apparatus 200 so that an ordinary reception operation is performed at a paging opportunity (e.g., a paging frame corresponding to the terminal ID of the terminal apparatus 200) of the terminal apparatus 200 during a selected paging segment. As an example, the DRX control unit 265 controls power supply so that power is supplied to a circuit involved in a reception operation, at the above paging opportunity during the selected paging segment.

On the other hand, for example, the DRX control unit 265 controls the terminal apparatus 200 so that at least a portion of the reception operation during paging segments other than the selected paging segments. As an example, the DRX control unit 265 controls power supply so that power is not supplied to at least a portion of circuits involved in the reception operation, during paging segments other than the selected paging segments.

As a result, more flexible DRX can be achieved. This point is the same as that described in connection with the base station 100.

Moreover, the DRX control unit 265 may control a DRX operation even when the terminal apparatus 200 is in a connection mode (e.g., an RRC connection mode).

(Display Control Unit 267)

The display control unit 267 controls display of an output screen by the display unit 250. For example, the display control unit 267 generates an output screen that is displayed by the display unit 250, and causes the display unit 250 to display the output screen.

<4. Flow of Process>

Next, an example of a communication control process according to the present embodiment will be described with reference to FIGS. 11-13.

(Communication Control Process by Base Station 100)

Firstly, an example of a communication control process by the base station 100 will be described with reference to FIGS. 11 and 12.

Selection and Notification of Paging Segment

Figure 11:
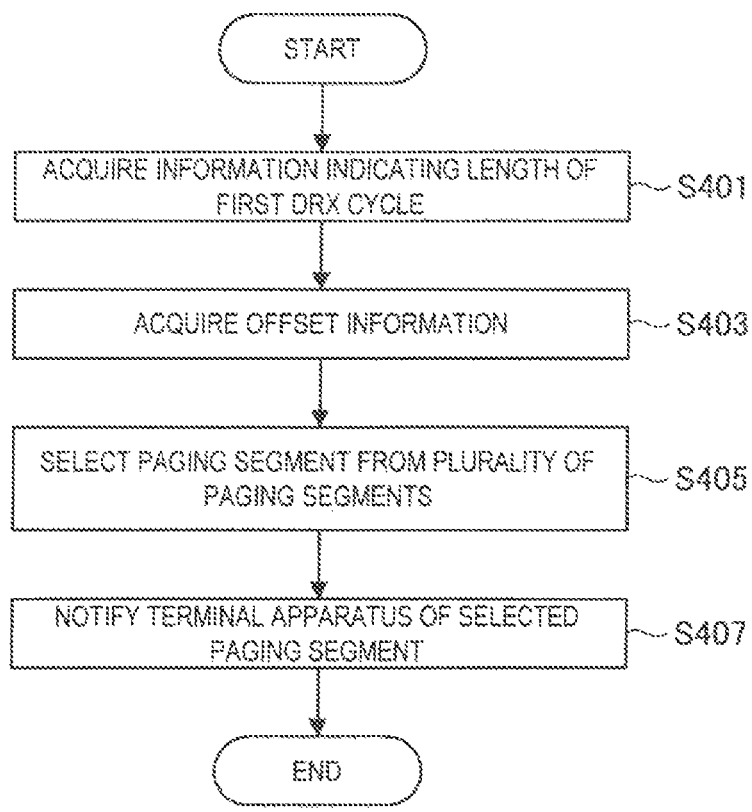
FIG. 11 is a flowchart showing an example of a schematic flow of a first communication control process by a base station according to an embodiment.

FIG. 11 is a flowchart showing an example of a schematic flow of a first communication control process by the base station 100 according to the present embodiment. The first communication control process includes selection and notification of a paging segment.

Initially, the paging segment selection unit 151 acquires information indicating the length of the first DRX cycle for the terminal apparatus 200 (S401). For example, the length of the first DRX cycle is not divisible by the length of a paging segment. The paging segment selection unit 151 also acquires shift information for shifting paging segments separately for the terminal apparatus 200 (S403).

Next, the paging segment selection unit 151 selects a paging segment from a plurality of paging segments that are repeatedly present during a period having the above length of the first DRX cycle, on the basis of information indicating the above length of the first DRX cycle and the above shift information (S405).

Thereafter, the paging segment notification unit 153 notifies the terminal apparatus 200 of the above selected paging segment (S407). Then, the process ends.

Generation of Paging Message

Figure 12:
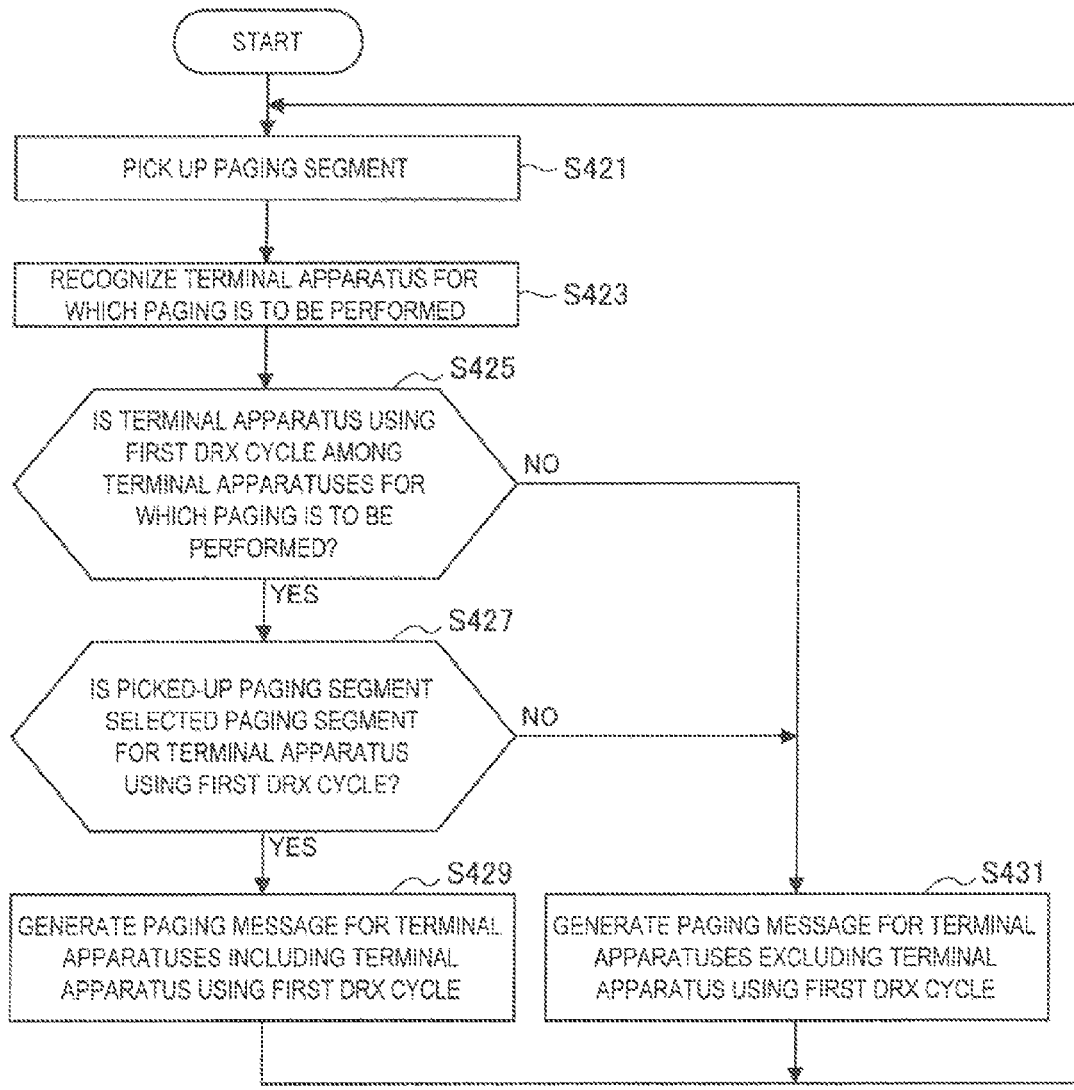
FIG. 12 is a flowchart showing an example of a schematic flow of a second communication control process by a base station according to an embodiment.
Figure 13:
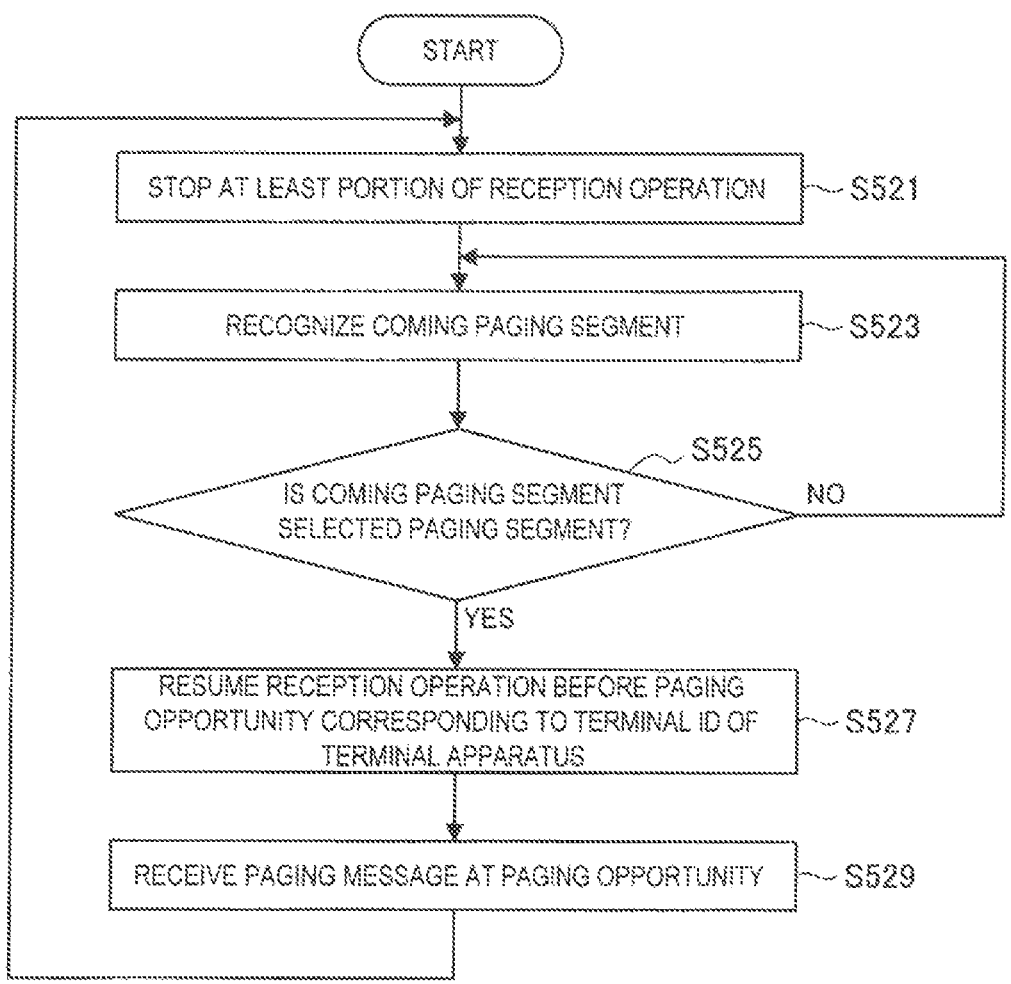
FIG. 13 is a flowchart showing an example of a schematic flow of a communication control process by a terminal apparatus according to an embodiment.

FIG. 12 is a flowchart showing an example of a schematic flow of a second communication control process by the base station 100 according to the present embodiment. The second communication control process includes generation of a paging message.

Initially, the paging control unit 155 picks up a paging segment (S421).

The paging control unit 155 also recognizes a terminal apparatus for which paging is to be performed (S423). Then, the paging control unit 155 determines whether the terminal apparatus 200, which uses the first DRX cycle, is among terminal apparatuses for which paging is to be performed (S425).

If the terminal apparatus 200, which uses the first DRX cycle, is among terminal apparatuses for which paging is to be performed (S425: Yes), the paging control unit 155 further determines whether the paging segment picked up has been selected for the terminal apparatus 200, which uses the first DRX cycle (S427). Otherwise (S425: No), the paging control unit 155 generates a paging message for terminal apparatuses (e.g., the terminal apparatus 20) excluding the terminal apparatus 200, which uses the first DRX cycle (S431).

If the paging segment picked up is the above selected paging segment (S427: Yes), the paging control unit 155 generates a paging message for terminal apparatuses (e.g., the terminal apparatus 200 and the terminal apparatus 20) including the terminal apparatus 200, which uses the first DRX cycle (S429). Otherwise (S427: No), the paging control unit 155 generates a paging message for terminal apparatuses (e.g., the terminal apparatus 20) excluding the terminal apparatus 200, which uses the first DRX cycle (S431).

After a paging message is generated (S429 and S431), the paging control unit 155 picks up the next paging segment (S421) and repeats the process.

Moreover, the generated paging message is transmitted during a paging segment picked up, at a corresponding paging opportunity.

(Communication Control Process by Terminal Apparatus 200)

Next, an example of a communication control process by the terminal apparatus 200 will be described with reference to FIG. 13. FIG. 13 is a flowchart showing an example of a schematic flow of the communication control process by the terminal apparatus 200 according to the present embodiment. The communication control process includes the DRX operation and the reception of a paging message.

Initially, the DRX control unit 265 controls the terminal apparatus 200 so that the terminal apparatus 200 stops at least a portion of the reception operation (S521).

The DRX control unit 265 also recognizes the coming paging segment (S523). Then, the DRX control unit 265 determines whether the coming paging segment is a selected paging segment (S525). If the coming paging segment is not a selected paging segment (S525: No), thereafter, the DRX control unit 265 subsequently recognizes the next coming paging segment (S523).

If the coming paging segment is a selected paging segment (S525: Yes), when the paging segment subsequently comes thereafter, the DRX control unit 265 controls the terminal apparatus 200) so that the terminal apparatus 200 resumes the reception operation before a paging opportunity corresponding to the terminal ID of the terminal apparatus 200 (S527). Then, the terminal apparatus 200 receives a paging message at the paging opportunity (S529).

Thereafter, the DRX control unit 265 controls the terminal apparatus 200 so that the terminal apparatus 200 stops a portion of the reception operation again (S521). Then, the process is repeated.

<5. Application Examples>

The technique according to the present disclosure is applicable to various products. For example, the base station 100 may be realized as any type of evolved Node B (eNB), such as a macro-eNB, a pico-eNB, or a Home-eNB. Alternatively, the base station 100 may be realized as other types of base stations, such as a Node B and a base transceiver station (BTS). The base station 100 may include a main body that controls wireless communication (also referred to as a base station apparatus), and one or more remote radio heads (RRHs) that are provided at locations different from that of the main body.

In addition, for example, the terminal device 200 may be realized as a mobile terminal such as a smartphone, a tablet personal computer (PC), a notebook PC, a portable game terminal, a mobile/dongle mobile router, or a digital camera, or an in-vehicle terminal such as a car navigation device. In addition, the terminal device 200 may be realized as a terminal which performs machine-to-machine (M2M) communication (which is also referred to as a machine-type communication (MTC) terminal). Furthermore, the terminal device 200 may be a wireless communication module mounted in such a terminal (e.g., an integrated circuit module configured in one die).

<5-1. Application Examples of a Base Station>

(First Application Example)

Figure 14:
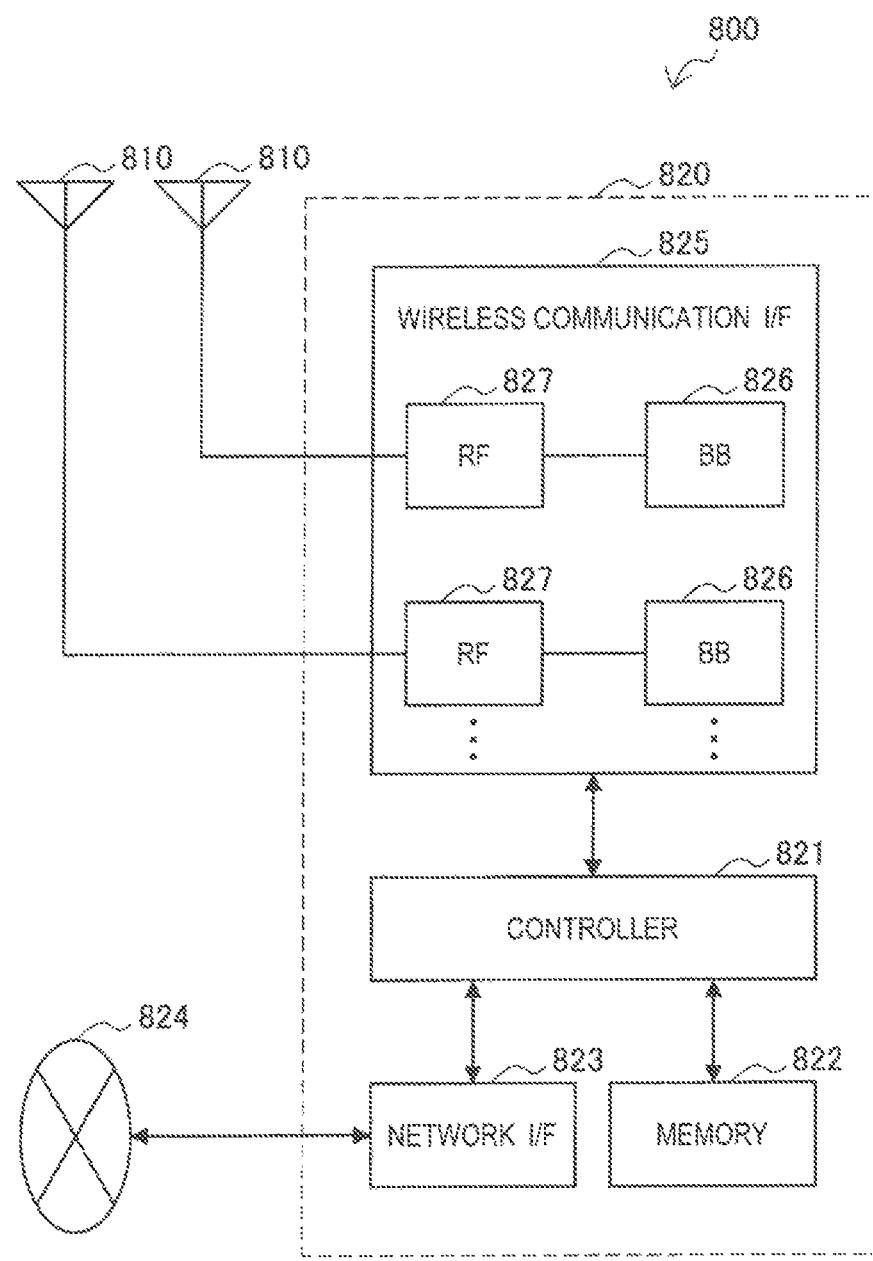
FIG. 14 is a block diagram showing a first example of a schematic configuration of an eNB to which technology according to the present disclosure may be applied.

FIG. 14 is a block diagram showing a first example of a schematic configuration of an eNB to which the technology according to the present disclosure may be applied. An eNB 800 includes one or more antennas 810, and a base station device 820. The respective antennas 810 and the base station device 820 may be connected to each other via an RF cable.

Each antenna 810 includes a single or a plurality of antenna elements (e.g., a plurality of antenna elements constituting a MIMO antenna), and is used by the base station device 820 to transmit and receive radio signals. The eNB 800 may include a plurality of antennas 810 as shown in FIG. 14, and the plurality of antennas 810 may respectively correspond to a plurality of frequency bands used by the eNB 800, for example. Moreover, although FIG. 14 illustrates an example of the eNB 800 including a plurality of antennas 810, the eNB 800 may also include a single antenna 810.

The base station device 820 is equipped with a controller 821, a memory 822, a network interface 823, and a wireless communication interface 825.

The controller 821 may be a CPU or DSP, for example, and causes various higher-layer functions of the base station device 820 to operate. For example, the controller 821 generates a data packet from data inside a signal processed by the wireless communication interface 825, and forwards the generated packet via the network interface 823. The controller 821 may also generate a bundled packet by bundling data from a plurality of baseband processors, and forward the generated bundled packet. The controller 821 may also have a logical function of performing a control such as radio resource control, radio bearer control, mobility management, admission control, or scheduling. Also, the control may be performed in cooperation with a neighboring eNB or core network node. The memory 822 includes a RAM and a ROM, and stores programs executed by the controller 821 as well as various control data (such as a terminal list, transmit power data, and scheduling data, for example).

The network interface 823 is a communication interface for connecting the base station device 820 to a core network 824. The controller 821 may communicate with a core network node or another eNB through the network interface 823. In this case, the eNB 800 and a core network node or another eNB may be connected together via a logical interface (e.g., the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the wireless communication interface 825.

The wireless communication interface 825 supports a cellular communication scheme such as Long Term Evolution (LTE) or LTE-Advanced, and provides a radio connection to a terminal positioned inside the cell of the eNB 800 via an antenna 810. Typically, the wireless communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in each layer (e.g., L1, Medium Access Control (MAC), Radio Link Control (RLC), and Packet Data Convergence Protocol (PDCP)). The BB processor 826 may have all or a portion of the above logical functions instead of the controller 821. The BB processor 826 may be a module including a memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. On the other hand, the RF circuit 827 may include components such as a mixer, a filter, and an amplifier, and transmits or receives a radio signal via an antenna 810.

The wireless communication interface 825 may also include a plurality of BB processors 826 as shown in FIG. 14, and the plurality of BB processors 826 may respectively correspond to a plurality of frequency bands used by the eNB 800, for example. In addition, the wireless communication interface 825 may also include a plurality of RF circuits 827 as shown in FIG. 14, and the plurality of RF circuits 827 may respectively correspond to a plurality of antenna elements, for example. Moreover, although FIG. 14 illustrates an example of the wireless communication interface 825 including a plurality of BB processors 826 and a plurality of RF circuits 827, the wireless communication interface 825 may also include a single BB processor 826 or a single RF circuit 827.

(Second Application Example)

Figure 15:
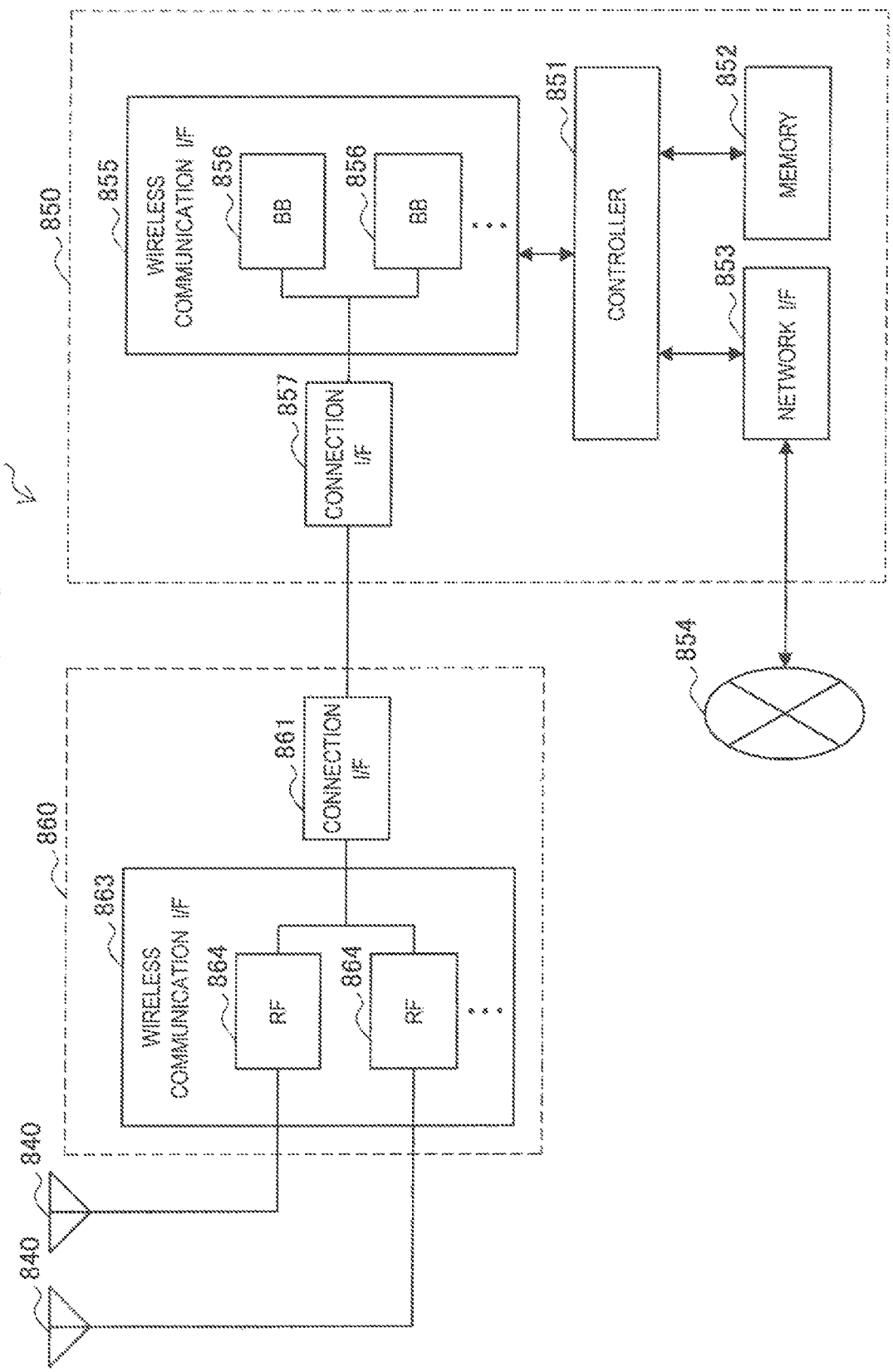
FIG. 15 is a block diagram showing a second example of a schematic configuration of an eNB to which technology according to the present disclosure may be applied.

FIG. 15 is a block diagram showing a second example of a schematic configuration of an eNB to which the technology according to the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or a plurality of antenna elements (e.g., a plurality of antenna elements constituting a MIMO antenna), and is used by the RRH 860 to transmit and receive radio signals. The eNB 830 may include a plurality of antennas 840 as shown in FIG. 15, and the plurality of antennas 840 may respectively correspond to a plurality of frequency bands used by the eNB 830, for example. Moreover, although FIG. 15 illustrates an example of the eNB 830 including a plurality of antennas 840, the eNB 830 may also include a single antenna 840.

The base station device 850 is equipped with a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 14.

The wireless communication interface 855 supports a cellular communication scheme such as LTE or LTE-Advanced, and provides a radio connection to a terminal positioned inside a sector corresponding to the RRH 860 via the RRH 860 and an antenna 840. Typically, the wireless communication interface 855 may include a BB processor 856 and the like. The BB processor 856 is similar to the BB processor 826 described with reference to FIG. 14, except for being connected to an RF circuit 864 of the RRH 860 via the connection interface 857. The wireless communication interface 855 may also include a plurality of BB processors 856 as shown in FIG. 15, and the plurality of BB processors 856 may respectively correspond to a plurality of frequency bands used by the eNB 830, for example. Moreover, although FIG. 15 illustrates an example of the wireless communication interface 855 including a plurality of BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication on the high-speed link connecting the base station device 850 (wireless communication interface 855) and the RRH 860.

In addition, the RRH 860 is equipped with a connection interface 861 and a wireless communication interface 863.

The connection interface 861 is an interface for connecting the RRH 860 (wireless communication interface 863) to the base station device 850. The connection interface 861 may also be a communication module for communication on the high-speed link.

The wireless communication interface 863 transmits and receives a radio signal via an antenna 840. Typically, the wireless communication interface 863 may include an RF circuit 864. The RF circuit 864 may include components such as a mixer, a filter, and an amplifier, and transmits or receives a radio signal via an antenna 840. The wireless communication interface 863 may also include a plurality of RF circuits 864 as shown in FIG. 15, and the plurality of RF circuits 864 may respectively correspond to a plurality of antenna elements, for example. Moreover, although FIG. 15 shows an example of the wireless communication interface 863 including a plurality of RF circuits 864, the wireless communication interface 863 may also include a single RF circuit 864.

In the eNB 800 and the eNB 830 shown in FIGS. 14 and 15, the paging segment selection unit 151, the paging segment notification unit 153, and the paging control unit 155 of the base station 100 described with reference to FIG. 4 may be implemented in the wireless communication interface 825 and the wireless communication interface 855 and/or the wireless communication interface 863. Alternatively, at least portion of these functions may be implemented in the controller 821 and the controller 851.

<5-2. Application Examples of a Terminal Device>

(First Application Example)

Figure 16:
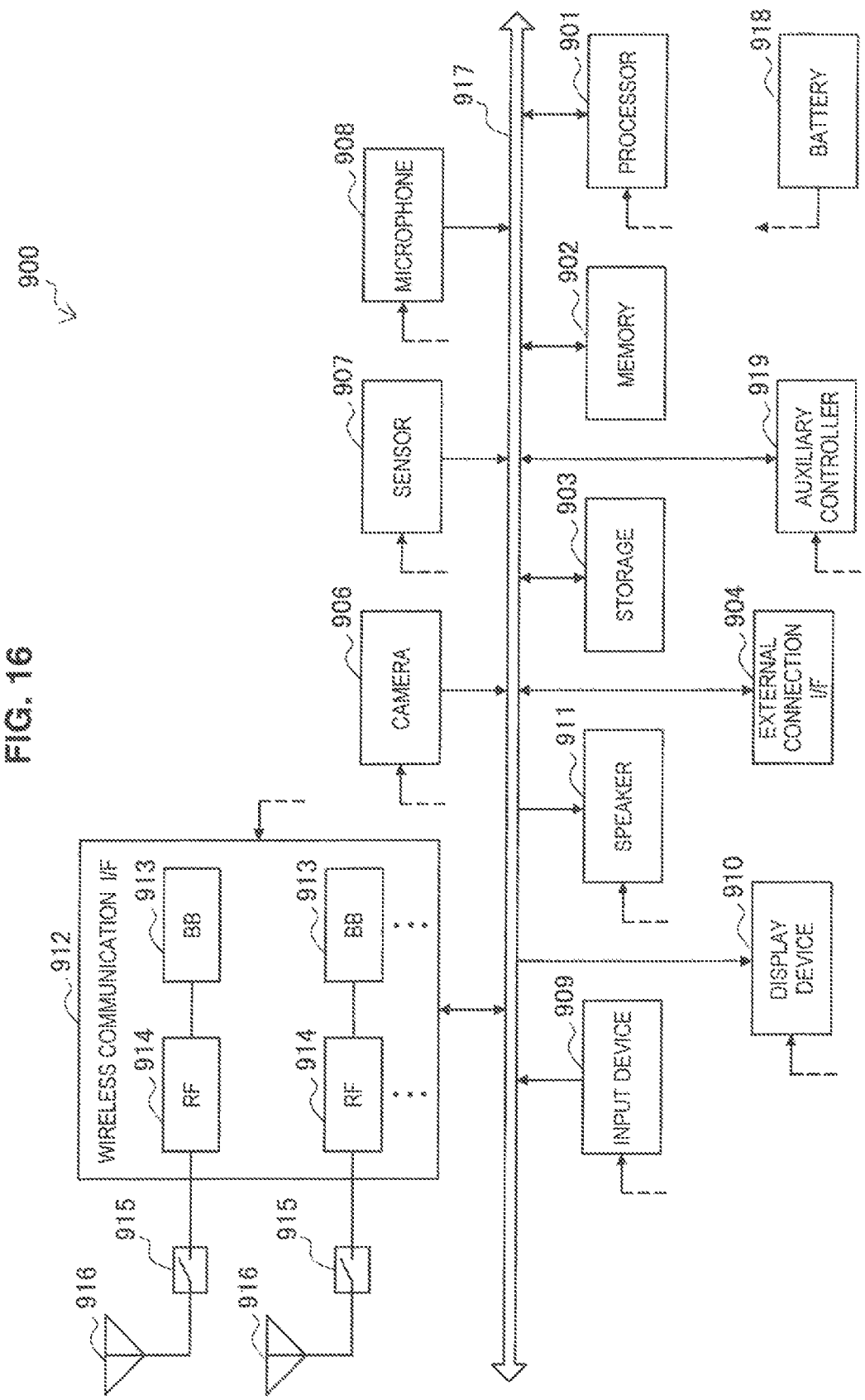
FIG. 16 is a block diagram showing an example of a schematic configuration of a smartphone to which technology according to the present disclosure may be applied.

FIG. 16 is a block diagram showing an example of a schematic configuration of a smartphone 900 to which the technology according to the present disclosure may be applied. The smartphone 900 is equipped with a processor 901, a memory 902, storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as a semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The wireless communication interface 912 supports a cellular communication scheme such as LTE or LTE-Advanced, and executes wireless communication. Typically, the wireless communication interface 912 may include a BB processor 913, an RF circuit 914, and the like. The BB processor 913 may conduct processes such as encoding/decoding, modulation/demodulation, and multiplexing/demultiplexing, for example, and executes various signal processing for wireless communication. On the other hand, the RF circuit 914 may include components such as a mixer, a filter, and an amplifier, and transmits or receives a radio signal via an antenna 916. The wireless communication interface 912 may also be a one-chip module integrating the BB processor 913 and the RF circuit 914. The wireless communication interface 912 may also include a plurality of BB processors 913 and a plurality of RF circuits 914 as illustrated in FIG. 16. Moreover, although FIG. 16 illustrates an example of the wireless communication interface 912 including a plurality of BB processors 913 and a plurality of RF circuits 914, the wireless communication interface 912 may also include a single BB processor 913 or a single RF circuit 914.

Furthermore, in addition to a cellular communication scheme, the wireless communication interface 912 may also support other types of wireless communication schemes such as a short-range wireless communication scheme, a near field wireless communication scheme, or a wireless local area network (LAN) scheme. In this case, a BB processor 913 and an RF circuit 914 may be included for each wireless communication scheme.

Each antenna switch 915 switches the destination of an antenna 916 among a plurality of circuits included in the wireless communication interface 912 (for example, circuits for different wireless communication schemes).

Each antenna 916 includes a single or a plurality of antenna elements (for example, a plurality of antenna elements constituting a MIMO antenna), and is used by the wireless communication interface 912 to transmit and receive radio signals. The smartphone 900 may also include a plurality of antennas 916 as shown in FIG. 16. Moreover, although FIG. 16 illustrates an example of the smartphone 900 including a plurality of antennas 916, the smartphone 900 may also include a single antenna 916.

Furthermore, the smartphone 900 may also be equipped with an antenna 916 for each wireless communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the wireless communication interface 912, and the auxiliary controller 919. The battery 918 supplies electric power to the respective blocks of the smartphone 900 shown in FIG. 16 via power supply lines partially illustrated with dashed lines in the drawing. The auxiliary controller 919 causes the smartphone 900 to operate minimal necessary functions, for example, in a sleep mode.

In the smartphone 900 shown in FIG. 16, the request notification unit 261, the information acquisition unit 263, and the DRX control unit 265 of the terminal apparatus 200 described with reference to FIG. 10 may be implemented in the wireless communication interface 912. Also, at least a portion of these functions may be implemented in the processor 901 or the auxiliary controller 919.

(Second Application Example)

FIG. 17 is a block diagram illustrating an example of a schematic configuration of a car navigation device 920 to which technology according to an embodiment of the present disclosure may be applied. The car navigation device 920 is equipped with a processor 921, a memory 922, a Global Positioning System (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (e.g., the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (e.g., a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display and displays a navigation function or an image of played-back content. The speaker 931 outputs audio of a navigation function or played-back content.

The wireless communication interface 933 supports a cellular communication scheme such as LTE or LTE-Advanced, and executes wireless communication. Typically, the wireless communication interface 933 may include a BB processor 934, an RF circuit 935, and the like. The BB processor 934 may conduct processes such as encoding/decoding, modulation/demodulation, and multiplexing/demultiplexing, for example, and executes various signal processing for wireless communication. On the other hand, the RF circuit 935 may include components such as a mixer, a filter, and an amplifier, and transmits or receives a radio signal via an antenna 937. The wireless communication interface 933 may also be a one-chip module integrating the BB processor 934 and the RF circuit 935. The wireless communication interface 933 may also include a plurality of BB processors 934 and a plurality of RF circuits 935 as shown in FIG. 17. Moreover, although FIG. 17 illustrates an example of the wireless communication interface 933 including a plurality of BB processors 934 and a plurality of RF circuits 935, the wireless communication interface 933 may also include a single BB processor 934 or a single RF circuit 935.

Furthermore, in addition to a cellular communication scheme, the wireless communication interface 933 may also support other types of wireless communication schemes such as a short-range wireless communication scheme, a near field wireless communication scheme, or a wireless LAN scheme. In this case, a BB processor 934 and an RF circuit 935 may be included for each wireless communication scheme.

Each antenna switch 936 switches the destination of an antenna 937 among a plurality of circuits included in the wireless communication interface 933 (e.g., circuits for different wireless communication schemes).

Each antenna 937 includes a single or a plurality of antenna elements (e.g., a plurality of antenna elements constituting a MIMO antenna), and is used by the wireless communication interface 933 to transmit and receive radio signals. The car navigation device 920 may also include a plurality of antennas 937 as shown in FIG. 17. Moreover, although FIG. 17 illustrates an example of the car navigation device 920 including a plurality of antennas 937, the car navigation device 920 may also include a single antenna 937.

Furthermore, the car navigation device 920 may also be equipped with an antenna 937 for each wireless communication scheme. In this case, the antenna switch 936 may be omitted from the configuration of the car navigation device 920.

The battery 938 supplies electric power to the respective blocks of the car navigation device 920 shown in FIG. 17 via power supply lines partially illustrated with dashed lines in the drawing. Also, the battery 938 stores electric power supplied from the vehicle.

In the car navigation apparatus 920 shown in FIG. 17, the request notification unit 261, the information acquisition unit 263, and the DRX control unit 265 of the terminal apparatus 200 described with reference to FIG. 10 may be implemented in the wireless communication interface 933. Also, all or a portion of these functions may be implemented in the processor 921.

In addition, the technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

<6. Conclusion>

In the foregoing, the communication apparatuses and processes according to embodiments of the present disclosure have been described with reference to FIGS. 1-17. According to the embodiments of the present disclosure, the paging segment selection unit 151 selects a paging segment from a plurality of paging segments that are repeatedly present during a period having the length of the first DRX cycle for the terminal apparatus 200. Also, the paging control unit 155, when performing paging for the terminal apparatus 200, performs paging during the above selected paging segment. Also, the above length of the first DRX cycle is not divisible by the length of each paging segment.

As a result, more flexible DRX can be achieved.

For example, firstly, a DRX cycle which is longer than the length of a paging segment can be used. As a result, the power consumption of the terminal apparatus 200 can be reduced. Also, for example, secondly, even when a long DRX cycle is used, a paging opportunity can be limited to a shorter period (i.e., within a selected paging segment) irrespective of the identification information (e.g., an IMSI) of the terminal apparatus, and therefore, paging can be performed at a more desirable timing. Also, for example, thirdly, even when a desired DRX cycle is not divisible by a paging segment, a DRX cycle which is considerably close to the desired DRX cycle can be provided.

As a result, for example, a practically useful DRX cycle having a length such as 5 min or 10 min can be provided with a small error (e.g., less than one paging segment). Also, for example, paging can be performed at desired time (e.g., time 0:00, 0:05, 0:10, etc.). Therefore, for example, a terminal apparatus can be operated according to requests of various applications such as an MTC application.

Moreover, for example, the paging control unit 155, when performing paging for the terminal apparatus 200, performs paging for the terminal apparatus 200 at a paging opportunity corresponding to the terminal ID of the terminal apparatus 200 during the above selected paging segment.

As a result, for example, paging for the terminal apparatus 200 having the first DRX cycle can be performed while an existing arrangement for paging is maintained.

Also, for example, the paging segment selection unit 151 selects a paging segment from the above plurality of paging segments for each of the above plurality of periods, on the basis of shift information for shifting paging segments separately for the terminal apparatus 200.

Such selection of a paging segment on the basis of shift information allows for any shift of the selected paging segment. Therefore, for example, a paging message can be transmitted and received at more desirable timings. As an example, a paging message can be transmitted and received at appropriate timings, taking into consideration the time it takes to perform data processing for each application, or the like.

Also, for example, the paging segment notification unit 153 notifies the terminal apparatus 200 of the above selected paging segment.

Such notification allows the terminal apparatus 200 to perform an appropriate DRX operation.

As a first example, the paging segment notification unit 153 notifies the terminal apparatus 200 of the above selected paging segment, by providing information indicating the above selected paging segment (i.e., the paging segment information) to the terminal apparatus 200.

As a result, the base station 100 can more freely select a paging segment, without depending on the terminal apparatus 200.

As a second example, the paging segment notification unit 153 may notify the terminal apparatus 200 of the above selected paging segment by providing, to the terminal apparatus 200, information indicating one or more parameters for specifying the above selected paging segment (i.e., the parameter information).

As a result, the terminal apparatus 200 can specify a selected paging segment on its own. Therefore, the terminal apparatus 200 does not have to be at all times notified of a selected paging segment. As a result, for example, the overhead used for notification of paging segments can be reduced.

Moreover, a paging segment may be selected from the above plurality of paging segments or the above paging may be performed during the above selected paging segment, taking into consideration the request of the terminal apparatus 200 related to a DRX operation.

As a result, for example, the likelihood that the terminal apparatus 200 performs a desired DRX operation possibly increases.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, an example has been described in which the base station has a main role in selecting a paging segment from a plurality of paging segments. The present disclosure is not limited to such an example. For example, an apparatus (e.g., a core network node) other than the base station may previously select the above paging segment, and notify the base station of the selected paging segment. Then, the base station may select the paging segment that the base station has been notified of, from a plurality of paging segments.

Also, an example has been described in which one DRX cycle (i.e., the first DRX cycle) which is not divisible by the length of a paging segment is used. The present disclosure is not limited to such an example. For example, one or more other DRX cycles that are not divisible by the length of a paging segment may be further used.

Also, an example has been described in which a single paging segment is used. The present disclosure is not limited to such an example. For example, one or more other paging segments may be further used. In this case, a DRX cycle having the same length as that of each of the one or more other paging segments may be further used. Also, a paging segment selected for a terminal apparatus that uses the first DRX cycle may be the above single paging segment and any of the above one or more other paging segments.

Also, an example has been mainly described in which each terminal apparatus uses a single DRX cycle. The present disclosure is not limited to such an example. For example, each terminal apparatus may use, as a DRX cycle, one of a plurality of DRX cycle candidates. Alternatively, one of a plurality of DRX cycle candidates may be determined by the base station.

Also, the processing steps in the communication control processes in this specification are not strictly limited to being executed in a time series following the sequence described in the flowcharts. For example, the processing steps in the communication control processes may be executed in a sequence that differs from the sequence described herein as flowcharts, and furthermore may be executed in parallel.

In addition, a computer program for causing hardware such as a CPU, a ROM, and a RAM installed in communication control devices (devices to configure base station devices) or a terminal device to exhibit the same functions as the respective configurations of the aforementioned communication control device or terminal device can also be created. In addition, a storage medium for storing the computer program may also be provided. In addition, an information processing device (e.g., a processing circuit or a chip) that includes a memory for storing the computer program (e.g., a ROM and a RAM) and a processor that executes the computer program (e.g., a CPU) may also be provided.

In addition, the effects described in the present specification are merely explanatory or illustrative, and not limitative. In other words, the technology according to the present disclosure can exhibit, along with or instead of the effects, other effects apparent to those skilled in the art from the description of the present specification.

Additionally, the present technology may also be configured as below.

(1)

A communication control apparatus including:

a selection unit configured to select a paging segment from a plurality of paging segments that are repeatedly present during a period having a length of a first discontinuous reception (DRX) cycle for a terminal apparatus; and a control unit configured to perform paging for the terminal apparatus during the selected paging segment if performing the paging, wherein the length of the first DRX cycle is not divisible by a length of each of the plurality of paging segments.

(2)

The communication control apparatus according to (1), wherein each of the plurality of paging segments has a predetermined length, and is a segment for performing paging for each terminal apparatus that uses a second DRX cycle of the predetermined length.

(3)

The communication control apparatus according to (1) or (2), wherein the control unit performs paging for the terminal apparatus at a paging opportunity during the selected paging segment, the paging opportunity corresponding to identification information of the terminal apparatus, if performing the paging for the terminal apparatus.

(4)

The communication control apparatus according to any one of (1) to (3), wherein the selection unit selects a paging segment from the plurality of paging segments for each of a plurality of successive periods each having the length of the first DRX cycle.

(5)

The communication control apparatus according to (4), wherein the selection unit selects a paging segment from the plurality of paging segments for each of the plurality of periods such that an interval of the plurality of paging segments selected for the plurality of periods becomes closer to the length of the first DRX cycle.

(6)

The communication control apparatus according to (5), wherein the selection unit selects a paging segment from the plurality of paging segments for each of the plurality of periods, using calculation including division involving the length of the first DRX cycle and the length of each of the plurality of paging segments.

(7)

The communication control apparatus according to (5) or (6), wherein the selection unit selects a paging segment from the plurality of paging segments for each of the plurality of periods, on the basis of shift information for shifting paging segments separately for a terminal apparatus.

(8)

The communication control apparatus according to any one of (1) to (7), further including:
a notification unit configured to notify the terminal apparatus of the selected paging segment.

(9)

The communication control apparatus according to (8),
wherein the notification unit notifies the terminal apparatus of the selected paging segment, by providing information indicating the selected paging segment to the terminal apparatus.

(10)

The communication control apparatus according to (8),
wherein the notification unit notifies the terminal apparatus of the selected paging segment, by providing information indicating one or more parameters for specifying the selected paging segment to the terminal apparatus.

(11)

The communication control apparatus according to any one of (1) to (10),
wherein the selection of a paging segment from the plurality of paging segments, or the paging performed during the selected paging segment, is performed, taking into consideration a request from the terminal apparatus related to a DRX operation.

(12)

The communication control apparatus according to any one of (1) to (11),
wherein the length of each of the plurality of paging segments is an integer multiple of a length from a start time point of a radio frame having a minimum system frame number (SFN) for identifying a radio frame to an end time point of a radio frame having a maximum SFN number.

(13)

The communication control apparatus according to any one of (1) to (12),
wherein the terminal apparatus performs machine-type communication (MTC).

(14)

A communication control method including:
selecting a paging segment from a plurality of paging segments that are repeatedly present during a period having a length of a first discontinuous reception (DRX) cycle for a terminal apparatus, using a processor; and
performing paging for the terminal apparatus during the selected paging segment if performing the paging,
wherein the length of the first DRX cycle is not divisible by a length of each of the plurality of paging segments.

(15)

A terminal apparatus including:
an acquisition unit configured to acquire information indicating a paging segment selected from a plurality of paging segments that are repeatedly present during a period having a length of a first discontinuous reception (DRX) cycle for the terminal apparatus; and
a control unit configured to control a DRX operation on the basis of the information indicating the paging segment,
wherein the length of the first DRX cycle is not divisible by a length of each of the plurality of paging segments.

(16)

The terminal apparatus according to (15),
wherein the acquisition unit acquires the information indicating the paging segment when notified of the paging segment by a base station.

(17)

The terminal apparatus according to (16),
wherein the acquisition unit acquires the information indicating the paging segment upon specifying the paging segment by using one of more parameters, if notified of the paging segment by the base station, by providing information indicating one or more parameters for specifying the paging segment.

(18)

The terminal apparatus according to any one of (15) to (17), further including:
a notification unit configured to notify a base station of a request from the terminal apparatus related to a DRX operation.

(19)

An information processing apparatus configured to control a terminal apparatus, including:
a memory configured to store a predetermined program; and
one or more processors capable of executing the predetermined program,
wherein the predetermined program is configured to execute
acquisition of information indicating a paging segment, selected from a plurality of paging segments that are repeatedly present during a period having a length of a first discontinuous reception (DRX) cycle for the terminal apparatus, and
control of a DRX operation on the basis of the information indicating the paging segment, and
the length of the first DRX cycle is not divisible by a length of each of the plurality of paging segments.

REFERENCE SYMBOLS LIST

1 communication system
10 cell
100 base station
151 paging segment selection unit
153 paging segment notification unit
155 paging control unit
200 terminal apparatus
261 request notification unit
263 information acquisition unit
265 discontinuous reception (DRX) control unit

The invention claimed is:

1. A communication control apparatus, comprising:
a selection unit configured to select a first paging segment from a plurality of paging segments that are repeatedly present during a period that has a first length equal to a second length of a first discontinuous reception (DRX) cycle for a first terminal apparatus; and
a control unit, configured to control paging for the first terminal apparatus in the selected first paging segment,
wherein a remainder of a division operation of the second length of the first DRX cycle by a third length of each of the plurality of paging segments, is greater than zero.

2. The communication control apparatus according to claim 1, wherein each of the plurality of paging segments is a segment for paging for each second terminal apparatus that uses a second DRX cycle of the third length.

3. The communication control apparatus according to claim 1,
wherein the control unit is further configured to control paging for the first terminal apparatus at a paging opportunity during the selected first paging segment, and wherein the paging opportunity corresponds to identification information of the first terminal apparatus.

4. The communication control apparatus according to claim 1, wherein the selection unit is further configured to select the first paging segment from the plurality of paging segments for each of a plurality of successive periods each having a fourth length equal to the second length of the first DRX cycle.

5. The communication control apparatus according to claim 4, wherein the selection unit is further configured to select a second paging segment from the plurality of paging segments for each of the plurality of successive periods such that an interval of the plurality of paging segments selected for the plurality of successive periods is equal to the second length of the first DRX cycle.

6. The communication control apparatus according to claim 5, wherein the selection unit is further configured to select the second paging segment from the plurality of paging segments for each of the plurality of successive periods, based on the division operation of the second length of the first DRX cycle and the third length of each of the plurality of paging segments.

7. The communication control apparatus according to claim 5, wherein the selection unit is further configured to select the second paging segment from the plurality of paging segments for each of the plurality of successive periods, based on shift information for shift of paging segments separately for the first terminal apparatus.

8. The communication control apparatus according to claim 1, further comprising a notification unit configured to notify the first terminal apparatus of the selected first paging segment.

9. The communication control apparatus according to claim 8, wherein the notification unit is further configured to notify the first terminal apparatus of the selected first paging segment based on information indicating the selected first paging segment to the first terminal apparatus.

10. The communication control apparatus according to claim 8, wherein the notification unit is further configured to notify the first terminal apparatus of the selected first paging segment based on information indicating at least one parameter to specify the selected first paging segment to the first terminal apparatus.

11. The communication control apparatus according to claim 1, wherein at least one of:
the selection unit is further configured to select the first paging segment from the plurality of paging segments, based on a request from the first terminal apparatus related to a DRX operation, or
the control unit is further configured to control the paging during the selected first paging segment, based on the request from the first terminal apparatus related to the DRX operation.

12. The communication control apparatus according to claim 1, wherein the third length of each of the plurality of paging segments is an integer multiple of a fourth length from a start time point of a first radio frame having a minimum system frame number (SFN) to identify the first radio frame to an end time point of a second radio frame having a maximum SFN.

13. The communication control apparatus according to claim 1, wherein a communication mode of the first terminal apparatus is machine-type communication (MTC).

14. A communication control method, comprising:
selecting a paging segment from a plurality of paging segments that are repeatedly present during a period that has a first length equal to a second length of a first discontinuous reception (DRX) cycle for a terminal apparatus; and
controlling paging for the terminal apparatus in the selected paging segment,
wherein a remainder of a division operation of the second length of the first DRX cycle by a third length of each of the plurality of paging segments, is greater than zero.

15. A terminal apparatus, comprising:
an acquisition unit configured to acquire information indicating a paging segment that is selected from a plurality of paging segments,
wherein the plurality of paging segments are repeatedly present during a period that has a first length equal to a second length of a first discontinuous reception (DRX) cycle for the terminal apparatus; and
a control unit configured to control a DRX operation based on the information indicating the paging segment,
wherein a remainder of a division operation of the second length of the first DRX cycle by a third length of each of the plurality of paging segments, is greater than zero.

16. The terminal apparatus according to claim 15, further comprising:
a receiving unit configured to receive from a base station, a notification message regarding the paging segment,
wherein the acquisition unit is further configured to acquire the information indicating the paging segment based on the notification message related to the paging segment.

17. The terminal apparatus according to claim 16,
wherein the receiving unit is further configured to receive information indicating at least one parameter to specify the paging segment, and
wherein the acquisition unit is further configured to acquire the information indicating the paging segment based on at least one parameter.

18. The terminal apparatus according to claim 15, further comprising: a notification unit configured to notify a base station of a request from the terminal apparatus related to the DRX operation.

19. An information processing apparatus configured to control a terminal apparatus, the information processing apparatus comprising:
a memory configured to store instructions; and
one or more processors configured to execute the stored instructions, wherein the one or more processors are configured to:
acquire information indicating a paging segment selected from a plurality of paging segments,
wherein the plurality of paging segments are repeatedly present during a period that has a first length equal to a second length of a first discontinuous reception (DRX) cycle for the terminal apparatus; and
control a DRX operation based on the information indicating the paging segment,
wherein a remainder of a division operation of the second length of the first DRX cycle by a third length of each of the plurality of paging segments, is greater than zero.

* * * * *